United States Patent
Yamada

(10) Patent No.: US 7,046,607 B2
(45) Date of Patent: May 16, 2006

(54) MULTIMEDIA COPY CONTROL SYSTEM AND METHOD USING DIGITAL DATA RECORDING MEDIUM AND OPTICAL DISC REPRODUCING APPARATUS

(75) Inventor: Jiro Yamada, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 892 days.

(21) Appl. No.: 09/778,895

(22) Filed: Feb. 8, 2001

(65) Prior Publication Data

US 2001/0017828 A1    Aug. 30, 2001

(30) Foreign Application Priority Data

Feb. 10, 2000  (JP) ............................. 2000-032911

(51) Int. Cl.
G11B 7/00  (2006.01)

(52) U.S. Cl. .................. 369/53.21; 369/47.21

(58) Field of Classification Search ............ 369/30.05, 369/30.04, 30.24, 30.3, 47.1, 47.12, 84, 85, 369/174, 233, 258
See application file for complete search history.

(56) References Cited

U.S. PATENT DOCUMENTS

| | | | |
|---|---|---|---|
| 5,130,864 A | 7/1992 | Shimada | |
| 5,719,937 A | 2/1998 | Warren et al. | |
| 5,729,516 A | 3/1998 | Tozaki et al. | |
| 5,774,452 A | 6/1998 | Wolosewicz | |
| 5,828,325 A | 10/1998 | Wolosewicz et al. | |
| 5,896,454 A | 4/1999 | Cookson et al. | |
| 5,940,135 A | 8/1999 | Petrovic et al. | |
| 6,320,829 B1 * | 11/2001 | Matsumoto et al. | ..... 369/47.12 |
| 6,370,319 B1 * | 4/2002 | Matsumoto et al. | |
| 2002/0156742 A1 * | 10/2002 | Ogino et al. | |

FOREIGN PATENT DOCUMENTS

| | | |
|---|---|---|
| EP | 0778566 | 6/1997 |
| EP | 0843471 | 5/1998 |
| EP | 0855837 | 7/1998 |
| EP | 0903736 | 3/1999 |
| EP | 0969462 | 1/2000 |
| EP | 1001624 | 5/2000 |

OTHER PUBLICATIONS

An Article by Bloom et al., entitled "Copy Protection for DVD Video", published Jul. 1999, no day.

* cited by examiner

Primary Examiner—Hoa T. Nguyen
Assistant Examiner—J. L. Ortiz-Criado
(74) Attorney, Agent, or Firm—Greenblum & Bernstein, P.L.C.

(57) ABSTRACT

In a multimedia copy control system, digital contents data stored in the digital data recording medium includes a first copy control information of a digital format and a second copy control information of an analog embedded format, and encryption of the reproduction output data from the recording medium is decrypted and judged for each digital contents unit under reproduction, and even in the case of detecting no first copy control information, the reproduction of the digital contents data is controlled based on the second copy control information.

14 Claims, 20 Drawing Sheets

| COPY CONTROL CONDITION | DG CCI STATUS C4 C3 | | REPRODUCTION CONTROL | WM CCI STATUS C4 C3 | | REPRODUCTION CONTROL |
|---|---|---|---|---|---|---|
| COPY FREE | 0 | 0 | INHIBITION | 0 | 0 | NORMAL |
| COPY WITH RESTRICTION | 1 | 0 | NORMAL | 1 | 0 | INHIBITION |
| COPY INHIBITION | 1 | 1 | NORMAL | 1 | 1 | INHIBITION |

Fig.10

| COPY CONTROL CONDITION | C PARAMETER | | | | | REMARKS |
|---|---|---|---|---|---|---|
| | STATUS | | NUMBER OF COPY | | | |
| | C4 | C3 | C2 | C1 | C0 | |
| COPY FREE | 0 | 0 | * | * | * | |
| COPY WITH RESTRICTION | 1 | 0 | 0 | 0 | 0 | n=1 |
| | | | 0 | 0 | 1 | n=2 |
| | | | 0 | 1 | 0 | n=4 |
| | | | 0 | 1 | 1 | n=6 |
| | | | 1 | 0 | 0 | n=8 |
| | | | 1 | 0 | 1 | n=10 |
| | | | 1 | 1 | 0 | n=RESERVED |
| | | | 1 | 1 | 1 | n=1 GENERATION COPY PERMISSION |
| COPY INHIBITION | 1 | 1 | * | * | * | |

Fig. 13

| COPY CONTROL CONDITION | DG CCI STATUS C4 | DG CCI STATUS C3 | REPRODUCTION CONTROL | WM CCI STATUS C4 | WM CCI STATUS C3 | REPRODUCTION CONTROL |
|---|---|---|---|---|---|---|
| COPY FREE | 0 | 0 | INHIBITION | 0 | 0 | NORMAL |
| COPY WITH RESTRICTION | 1 | 0 | NORMAL | 1 | 0 | INHIBITION |
| COPY INHIBITION | 1 | 1 | NORMAL | 1 | 1 | INHIBITION |

MULTIMEDIA COPY CONTROL SYSTEM AND METHOD USING DIGITAL DATA RECORDING MEDIUM AND OPTICAL DISC REPRODUCING APPARATUS

BACKGROUND OF THE INVENTION

1. Field of the Invention

The present invention generally relates to a multimedia copy control system and method using a digital data recording medium, and in particular, to an optical disc reproducing apparatus in combination with a digital data recording apparatus, adapted to control duplication of digital data, preventing unauthorized duplication of contents in an optical disc on which multimedia data including digital video data and digital audio data is recorded.

2. Description of the Prior Art

In recent years, DVD (Digital Versatile Disc)-Video, DVD-Audio and the like with dramatically improved recording capacity have come into use in place of conventional laser disc and video CD, and a number of movie titles and music titles have been released in DVD. High quality digital audio data or digital video data is recorded on these DVD-Video standard disc and DVD-Audio standard disc, and because the digital data is of high quality, AV equipment makers have not taken measure of outputting digital signal data from the inside to the outside of the equipment from the fear that unauthorized digital copy is made. This is because contents providers who produce movie titles and music titles and provide such titles would be significantly damaged if digital copying is made and a number of unauthorized copy discs appear on the market.

In a conventional audio equipment, such as for example, CD (compact disc) player or MD (mini disc) player, digital audio data is outputted outside the equipment by using IEC60958 as a digital I/F. This IEC60958 includes generation copy control management information called CGMS (Copy Generation Management System) and controls the generation copy control management information so that even in the case where digital copy is permitted, digital copy of first generation is allowed for an unlimited number of times, whereas digital copy of second generation is prohibited. However, there has been a drawback that if someone tampers with a CGMS generation copy control management device of a recorder side, digital copies of unlimited generations can be easily produced.

FIG. 14 shows an outline of a reproducing/recording system in a conventional system of DVD. An authorized optical disc player 209 comprises: an encryption decoder 203 for decoding an encryption from a system stream; a reproduction controller 204 for servo-controlling an optical pickup and a working mechanism relating to reproduction of an optical disc; an AV decoder 206 for converting a system stream to a digital audio or digital video signal; an analogue output circuit 207 for converting the digital audio or the digital video signal into an analogue signal to output the analogue signal; and a digital output circuit 208 for converting the digital audio or digital video signal into a signal of a definite output format (for example, IEC60958, IEEE1394 and the like) to output the digital signal.

Meanwhile, an authorized optical disc recorder 216 comprises: an analogue input circuit 210 for converting an analogue audio or video input signal into a digital signal; a digital input circuit 211 for converting an input signal which is input in a definite digital format into a digital audio or digital video signal; an AV encoder 212 for converting the digital audio or digital video signal into a system stream; a recording controller 213 for servo-controlling an optical pickup and an working mechanism relating to recording of an optical disc; copy control management data (CCI) detector/rewriter 214 for detecting copy control management information from the system stream and rewriting it as necessary; and an encryption generator 215 for adding an encryption to the system stream. As for an commercially available press disc 201, the authorized optical disc player 209 reproduces an audio or video signal, which is digitally or analoguely connected to the authorized optical disc recorder 216 for creating a copy disc 202.

A case of authorized two generation recording in this conventional system will be described with reference to FIG. 15. It is assumed that only digital copy control information (hereinafter, referred to as digital CCI or "DGCCI") is recorded in a predetermined form on a commercially available press disc 220, and the commercially available press disc 220 is under the condition with limitation that permits only one generation copy. This copy control management information is shown by a block 250. In other words, in this commercially available press disc 220, C parameters as shown in FIG. 10 indicate a status "C4=1, C3=0" (hereinafter, expressed by "C4C3=10"). When reproducing the commercially available press disc 220 with an authorized optical disc player 228, a digital output circuit 227 converts a digital audio or digital video signal into a signal of a definite digital output format to output the digital signal.

When the digital signal outputted in the definite digital format is inputted to an authorized optical disc recorder 235 from the authorized optical disc player 228, the inputted digital signal is converted into a digital audio or digital video signal by a digital input circuit 230. The converted digital audio or digital video signal is then converted into a system stream by means of an AV encoder 232. With the system stream, a copy control management data (CCI) detector/rewriter 233 detects the digital CCI (250) and determines the status to be "C4C3=10" that permits one generation copy and thus rewrites the C3 parameter of the digital CCI from 0 to 1 to make it into "C4C3=11" so as to prohibit copy of second and subsequent generations. An encryption generator 234 then adds an encryption to the system stream and a recording operation is performed under a control of a recording controller 231, whereby a first generation copy disc 221 is created. The resultant copy controlling management information of this case is shown by a block 251.

When reproducing the copy disc 251 by an authorized optical disc player 242, even though C parameters of the digital CCI have "C4C3=11" indicative of copy being prohibited, the reproduction is performed by the optical disc player 242 to output a system stream digital signal. The reason why the player normally performs a reproducing operation without stopping the reproduction even if copy is prohibited is that, it is impossible to authorize equipments to be connected, and the equipments to be connected to the digital output circuit are not limited to the recorder but may be an audio/video reproducing equipment with a digital input (such as for example, digital TV and digital amplifier). When this reproduced digital signal is inputted to an authorized optical disc recorder 249, a copy control management data (CCI) detector/rewriter 247 detects the digital CCI (251) to determine that copy is prohibited and does not perform a recording operation. As a result of this operation, a copy disc of second generation is not created.

However, when the copy control management data detector/rewriter (233) of the optical disc recorder (235) is tampered with, unauthorized copy becomes possible in the following manner. A case of unauthorized two generation digital recording in the same conventional system will be describe with reference to FIG. 16. Likewise the commercially available press disc 220, an commercially available press disc 260 is under the condition with limitation that permits only one generation copy, digital CCI satisfies "C4C3=10" and copy controlling management information thereof is shown by a bock 293. When reproducing the commercially available press disc 260 with an authorized optical disc player 269, a digital output circuit 268 converts a digital audio or digital video signal into a signal of a definite digital output format to output the digital signal.

When the digital signal outputted in the definite digital format is inputted into an unauthorized optical disc recorder 278 from the authorized optical disc player 269, the inputted digital signal is converted into a digital audio or digital video signal by a digital input circuit 271. The converted digital audio or digital video signal is then converted into a system stream by means of an AV encoder 273. For the system stream, a tampered copy control management data (CCI) detector/rewriter 274 detects the digital CCI (293) having "C4C3=10" that permits one generation copy. The tampered copy control management data detector/rewriter 274 tampers the digital CCI data to set for copy free "C4C3=00" though it should rewrite the C3 parameter of the digital CCI from 0 to 1 to make it into "C4C3=11" so as to prohibit copy of second and subsequent generations. Then, an encryption generator 276 adds an encryption to the system stream, and a recording operation is performed under a control of a recording controller 272, whereby a one generation copy disc 261 of copy free having no limitation for copy is created. Copy controlling management information of this case is shown by a block 294.

Since the digital CCI data of the one generation copy disc 261 is tampered to copy free, when this disc 261 is reproduced by an authorized optical disc player 285, a digital output circuit 284 converts a digital audio or digital video signal into a signal of a definite digital output format and outputs the digital signal. When the digital signal outputted in the definite digital format from the authorized optical disc player 285 is inputted to an unauthorized optical disc recorder 292, since the digital CCI data is set to copy free "C4C3=00", digital copy discs of unlimited generations will be created. Copy control management information at this time is shown by a block 295. In other words, in the conventional system, once an unauthorized copy disc is created by means of a tampered unauthorized optical disc recorder, a copy free disc is to be created because of such an unauthorized copy disc even in the case of using an authorized optical disc player and authorized optical disc recorder.

A case of an authorized two generation analogue recording in this conventional system will described with reference to FIG. 17. Assuming that a commercially available press disc 300 is under the condition of copy prohibition, digital CCI satisfies "C4C3=11" and copy controlling management information thereof is shown by a block 331. When reproducing the commercially available press disc 300 with an authorized optical disc player 309, an analogue output circuit 307 outputs an analogue audio or analogue video signal, and a digital output circuit 308 (although not connected to a recorder) converts a digital audio or digital video signal into a signal of a definite digital output format to output the signal.

When the analogue signal outputted from the authorized optical disc player 309 is inputted to an authorized optical disc recorder 316, the inputted analogue signal is converted into a digital audio or digital video signal by means of an analogue input circuit 310. The converted digital audio or digital video signal is then converted into a system stream by means of an AV encoder 313. Since this converted system stream does not include digital CCI data, copy management information does not exist. Therefore, it is impossible to manage copy by means of a copy control management data (CCI) detector/rewriter 314. Moreover, since the input signal is analogue signal, no encryption is added to the system stream by means of an encryption generator 315, and a recording controller 312 performs a recording operation without adding an encryption, whereby a first generation copy disc 301 having no copy management information is created.

This copy disc 301 can be reproduced when reproduced by means of an authorized disc player 323, and because of absence of copy management information, it is possible to perform analogue recording or digital recording also by using an authorized optical dies recorder 330. That is, in the conventional system, even in the case of using an authorized optical disc recorder which is not tampered with, by creating a copy disc once by performing analogue recording, copy free discs allowing digital recording or analogue recording will be unlimitedly created even by using an authorized optical disc player or authorized optical disc recorder.

Now, with reference to FIG. 18, a detail block of the reproducing-recording system in the conventional case will be explained, and then explanation on digital recording operation and analogue recording operation will be made.

An optical disc player 352 comprises: a spindle motor 341 for rotating a disc 340; an optical pickup 342 for reading a signal recorded on the disc 340; a mechanism control section 343 for driving and controlling the spindle motor 341 and the optical pickup 342; a signal processing section 344 which extracts a system stream digital signal by performing data punching or error correcting of the output of the optical pickup 342 and supplies a control signal to the mechanical control section 343; an encryption decoder 345 for decoding an encryption from the system stream; an AV decoder 347 for extracting a digital audio or digital video signal from the encryption-decoded system stream and decoding the digital audio or video signal; a DA converter 348 for converting the digital audio or digital video signal into an analogue audio or analogue video signal; a digital signal output control section 349 for converting the digital audio or digital video signal into a signal of a definite output format (for example IEC60958, IEEE1394 and the like) to perform output control; an analogue signal output control section 350 for performing output control of the analogue audio or analogue video signal; and a system controller 351 for controlling the digital signal output control section 349 and analogue signal output control section 350 while reading the digital CCI data, as well as for controlling the mechanism control section 343.

Meanwhile, an optical disc recorder 365 comprises: a spindle motor 354 for rotating a recordable disc 353; an optical pickup 355 for recording a signal encoded by a recording signal processing section 357 on the recordable disc 353; a mechanism control section 356 for driving and controlling the spindle motor 354 and the optical pickup 355; the recording signal processing section 357 for outputting a recording signal to the optical pickup 355 while adding an error correcting code to a system stream on which an encryption has been added and performing modulation on the same, and for supplying a control signal to the mechanism control section 356 at the time of recording; a digital input converting section 360 for converting a definite digital signal outputted from the outside into a digital audio or digital video signal; an AD converter 359 for converting an analogue audio or video input signal into a digital signal; an AV encoder 361 for encoding the digital audio or digital video signal into a system stream; a digital CCI decoder 358 for detecting digital CCI from the system stream signal; a digital CCI encoder 362 for rewriting digital CCI data on the system stream signal in accordance with a command of a system control section 364; an encryption generator 363 for encrypting the system stream by adding an encryption thereto and transferring the encrypted system stream to the recording signal processing section 357; and a system controller 364 which reads the digital CCI data and provides the digital CCI encoder 362 with a command to rewrite the digital CCI data, as well as controls the mechanism control section 356.

Digital recording operation is as follows. The optical pickup 342 reads a signal recorded on the disc 340, and the signal processing section 344 performs data punching and error correcting to extract a system stream digital signal while supplying the mechanism control section 343 with a control signal. The decoder 345 transfers a system stream of which encryption has been decoded from the system stream to the AV decoder 347. The AV decoder 347 extracts a digital audio or digital video signal from the system stream to decode the same, and transfers the decoded signal to the digital signal output control section 349. The digital signal output control section 349 outputs the digital audio or digital video signal while converting it into a signal of a definite output format (such as for example, IEC60958 and IEEE1394).

A definite digital signal inputted from the outside is converted into a digital audio or digital video signal by the digital input converting section 360 and transferred to the AV encoder 361. The AV encoder 361 encodes the digital audio or digital video signal into a system stream. The digital CCI decoder 358 detects digital CCI data from the system stream signal to transfer this digital CCI data to the system control section 364. The system control section 364 reads the digital CCI data and, when necessary, provides the digital CCI encoder 362 with a command to rewrite the digital CCI data on the system stream, and also controls the mechanism control section 356. The system stream is encrypted by the encryption generator 363, and then the recording signal processor 357 adds an error correcting code and perform modulation on the encrypted system stream to output a recording signal to the optical pickup 355 and record the system stream on the recordable disc 353.

Analogue recording operation is as follows. The optical pickup 342 reads a signal recorded on the disc 340, and the signal processing section 344 performs data punching and error correcting to extract a system stream digital signal while supplying a control signal to the mechanism control section 343. The decoder 345 decodes the system stream and transfers the decoded system stream to the AV decoder 347. The AV decoder 347 extracts a digital audio or digital video signal from the system stream to decode the same, and transfers the decoded signal to the DA converter 348. The DA converter 348 outputs the digital audio or digital video signal while converting it into an analogue signal.

When inputted to the optical disc recorder 365, the analogue signal is converted into a digital audio or digital video signal by means of the AD converter 359, and transferred to the AD encoder 361. The AD encoder 361 encodes the digital audio or digital video signal into a system stream. Since an analogue input signal does not include digital CCI data, the digital CCI decoder 358 transfers information to the system control section 364 that digital CCI data is not detected from the system stream signal. The system control section 364 does not issue a command to the digital CCI encoder 362, does note rewrite the digital CCI data on the system stream because there is no digital CCI data, and also controls the mechanism control section 356. The system stream is encrypted by the encryption generator 363, and then the recording signal processor 357 adds an error correcting code and perform modulation on the encrypted system stream to output a recording signal to the optical pickup 355 and record the system stream on the recordable disc 353. The disc on which recording is made in the above manner does not include digital CCI data.

Next, CCI data on the disc file structure of the conventional system will be described with reference to FIG. 19. A disc 369 includes mainly four zones, i.e., VolumeZone, AudioZone, VideoZone and OtherZone, and among which, copy control management information of audio contents and video contents are described on AudioZone 370 and VideoZone 371, respectively.

AudioZone 370 includes a plurality of audio title sets ATS (372), and each audio title set ATS includes an audio title set management information storage area ATSI (373) and an audio data object collection AOBS (374). The audio data object collection AOBS includes a plurality of audio contents as reproduction units and digital CCI data corresponding to the respective reproduction units of audio contents. As shown in FIG. 19, ATS#1 (372) includes ATSI#1 (373) and AOBS (374), and AOBS (374) includes p Track numbers as reproduction units of the audio contents. Likewise, also VideoZone 371 includes digital CCI data with respect to audio/video contents for each Chapter which is a reproduction unit.

Next, CCI data on the object data structure of the conventional system will be described with reference to FIG. 20. FIG. 20 shows an example of audio data. Audio title set collection AOTT_AOBS (380) includes a plurality of audio title sets AOTT_AOB (381). The audio title set AOTT_AOB (381) includes a plurality of audio packs A_PCK (382), and further each audio pack A_PCK (382) includes PrivateHeader (383) and Audio data (385). Then, the Private Header (383) includes a region 384 storing the digital CCI. A plurality of audio packs A_PCK (382) constitute Audio_Cell (386), and assembly of plural Audio_Cell (386) constitutes a Track (387) which is a reproduction unit. In this reproduction unit Track (387), data of the digital CCI (384) is constant and will not change. Conversely, digital CCI data corresponds to a Track unit.

In this object data structure, PTS region in the fifth stair is for storing reproduction time data, sub_stream_id region is for storing stream types, first_access_unit_pointer indicates a first byte of an audio frame of this A_PCT.

Such digital CCI data is included in the form of digital signal data in object data of a disc, however, there is a danger that a person who is familiar with the object data structure can easily tamper with the copy control management data (CCM) detector/rewriter to thereby tamper with the digital CCI data. In addition, there is a problem that once an analogue copy is made, copies of consequent generations are enabled without limitation. Contents providers who produce and provide movie titles and music titles have special fear that digital AV contents data that would get to higher quality in future will be digitally copied illegally in large extent without deteriorating quality thereof.

SUMMARY OF THE INVENTION

The present invention has been developed to solve these problems and has an object to provide a copy control system and method of digital data and an optical disc reproducing apparatus using a specific recording medium, which can prevent unauthorized copies from being created unlimitedly even if digital CCI data is tampered with by means of an unauthorized recorder, or even if an analogue copy is made by means of an unauthorized recorder.

In order to achieve the object mentioned above, a first aspect of the present invention provides a multimedia copy control system for controlling a copy of a digital data recording medium in which digital contents data is stored and from which the digital contents data is reproduced and recorded to another recording medium for copying, wherein the digital contents data stored in the digital data recording medium includes a first copy control information of a digital format and a second copy control information of an analog embedded format, said system comprising: encryption judging means decrypting reproduction output data from the digital data recording medium and judging whether the reproduction output data is encrypted data; first copy control detection means detecting the first copy control information from the decrypted reproduction data; extraction means extracting the digital contents data from the decrypted reproduction data; and second copy control detection means detecting the second copy control information from the extracted digital contents data, wherein encryption of the reproduction output data from the recording medium is decrypted and judged for each digital contents unit under reproduction, and in the case where said first copy control detection means detects the first copy control information, the reproduction of the digital contents data is controlled based on the first copy control information, and in the case where said first copy control detection means detects no first copy control information, the reproduction of the digital contents data is controlled based on the second copy control information.

A second aspect of the present invention provides a multimedia copy control method for controlling a copy of a digital data recording medium in which digital contents data is stored and from which the digital contents data is reproduced and recorded to another recording medium for copying, wherein the digital contents data stored in the digital data recording medium includes a first copy control information of a digital format and a second copy control information of an analog embedded format, said method comprising: decrypting reproduction output data from the digital data recording medium and judging whether the reproduction output data is encrypted data; detecting the first copy control information from the decrypted reproduction data; extracting the digital contents data from the decrypted reproduction data; and detecting the second copy control information from the extracted digital contents data, wherein encryption of the reproduction output data from the recording medium is decrypted and judged for each digital contents unit under reproduction, and in the case of detecting the first copy control information, the reproduction of the digital contents data is controlled based on the first copy control information, and in the case of detecting no first copy control information, the reproduction of the digital contents data is controlled based on the second copy control information.

As a result of this system and method, even if digital copy controlling management information data is tampered using an unauthorized recorder and an authorized digital copy is made, or an unauthorized analogue copy is made by using an unauthorized recorder, it is possible to prevent unlimited unauthorized copies from being created by adding reproduction limitation by judging as an illegal recording medium at the time of reproduction.

A third aspect of the present invention provides an optical disk reproduction device for reproducing an optical disk in which digital contents data is stored and from which the digital contents data is reproduced for copying, wherein the digital contents data stored in the optical disk includes a first copy control information of a digital format and a second copy control information of an analog embedded format, said reproduction device comprising: stream data extracting means extracting stream data from the reproduction output data of the optical disk; encryption decoder means decrypting the extracted reproduction stream data and judging whether the reproduction stream data is encrypted data; first copy control detection means detecting the first copy control information from the decrypted reproduction stream data; contents decoder means extracting and decoding the digital contents data from the decrypted reproduction stream data; second copy control detection means detecting the second copy control information from the extracted digital contents data; analog output control means generating analog contents data from the extracted digital contents data; digital output control means converting the extracted digital contents data to a specified output format data to be generated therefrom; and a system controller receiving the first and second copy control information and controlling said analog output control means and said digital output control means, wherein encryption of the reproduction output data from the optical disk is decrypted and judged for each digital contents unit under reproduction, and in the case where said first copy control detection means detects the first copy control information, the reproduction of the digital contents data is controlled based on the first copy control information, and in the case where said first copy control detection means detects no first copy control information, the reproduction of the digital contents data is controlled based on the second copy control information.

A fourth aspect of the present invention provides a digital data reproducing and recording system which is a connection combination of a recording medium reproduction device reproducing digital data of a recording medium and a recording medium recording device recording the reproduced digital data to another recording medium, adapted to control a multimedia copy of the recording medium, wherein the digital contents data stored in the recording medium includes a first copy control information of a digital format and a second copy control information of an analog embedded format, said reproduction device comprising: encryption decoder means decrypting reproduction stream data output from the recording medium and judging whether the reproduction stream data is encrypted data; first copy control detection means detecting the first copy control information from the decrypted reproduction stream data; contents extracting means extracting the digital contents data from the decrypted reproduction stream data; second copy control detection means detecting the second copy control information from the extracted digital contents data; analog output control means generating analog contents data from the extracted digital contents data; and digital output control means converting the extracted digital contents data to a specified output format data to be generated therefrom, wherein, in the case where said reproduction device and said recording device are digital-connected via said digital output control means, the digital contents data reproduced from said reproduction device includes both the first and second copy control information, and in the case where said reproduction device and said recording device are analog-c connected via said analog output control means, the analog contents data reproduced from said reproduction device includes only the second copy control information.

A fifth aspect of the present invention provides a digital data recording medium adapted for multimedia copy control, said recording medium comprising: at least one contents data storage region storing digital contents data which includes first copy control information of a digital format and second copy control information of an analog embedded format, said storage first and second copy control information being allocated in pair for each digital contents unit, wherein the digital contents data stored in the recording medium is adapted to be reproduced from the digital data recording medium so that the reproduced data is decrypted for use in judging whether the reproduction output data is encrypted data, the decrypted reproduction data being adapted for use in detecting the first copy control information and extracting the digital contents data therefrom, and the extracted digital contents data being adapted for use in detecting the second copy control information.

As a result of this, even if an unauthorized copy disc is created by using an optical disc recorder having illegally tampered digital CCI encoder, by making judgment by detecting said digital CCI data or said watermark CCI data recorded for each digital audio contents unit or digital video contents unit under reproduction, it is possible to judge whether each contents unit is legal or illegal. Accordingly, it is possible to provide an optical disc copy control system which can prevent illegal copy discs from increasing unlimitedly.

BRIEF DESCRIPTION OF THE DRAWINGS

These and other objects and features of the present invention will be readily understood from the following detailed description taken in conjunction with preferred embodiments thereof with reference to the accompanying drawings, in which like parts are designated by like reference numerals and in which:

FIG. 10 is an explanatory view showing copy control management information in the same embodiment;

FIG. 13 is an explanatory view showing relationship between copy controlling management information and player reproduction control in the same embodiment;

DETAILED DESCRIPTION OF THE PREFERRED EMBODIMENTS

In the following, embodiments of the present invention will be described with reference to FIGS. 1 to 13.

Before the description proceeds, it is noted here that, while the following description will be made for the case of using an optical disc as a recording medium storing digital audio or digital video data including copy control management information, the present invention is not limit to this and applicable to comparable media for recording and reproducing digital data, for example, tape and semiconductor memory.

First Embodiment

Figure 1:
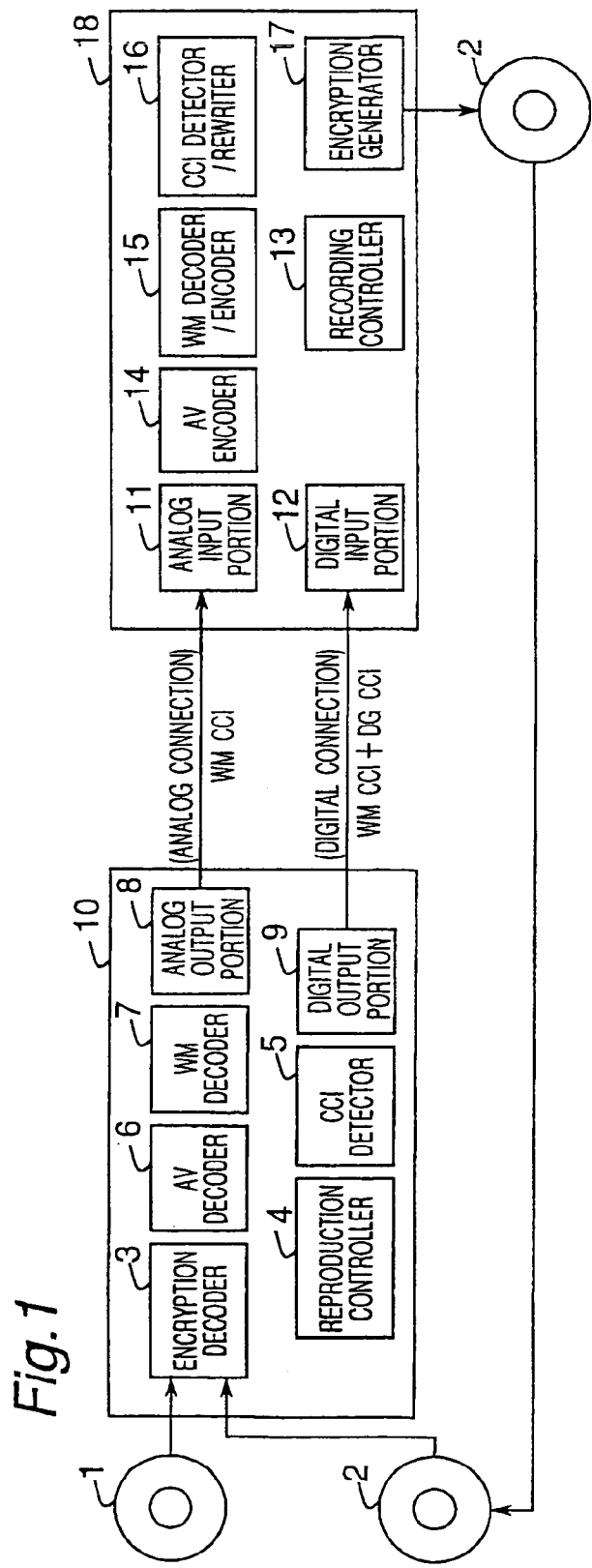
FIG. 1 is a block diagram of an outline of a copy control system of an optical disc in the first embodiment of the present invention.

FIG. 1 shows an outline of a reproducing/recording system based on a copy control method of an optical disc according to the first embodiment of the present invention.

In FIG. 1, reference numeral 1 denotes a commercially available press disc and numeral 2 denotes a copied disc. The commercially available press disc 1 stores digital contents data such as digital audio and/or digital video data having an encryption added to a system stream. The digital contents data includes two types of copy control management information (CCI), i.e., a first copy control information of a digital CCI (referred to as "DGCCI") type and a second copy control information of an analog embedded type (hereinafter, referred to as "watermark" or "WMCCI") which are recorded in the disc. Detail of the WMCCI will be described later with reference to FIG. 11.

In FIG. 1, an authorized optical disc player 10 includes: an encryption decoder 3 for decoding an encryption from a system steam reproduced from the optical disc 1; a reproduction controller 4 for servo-controlling an optical pickup and a working mechanism relating to reproduction of the optical disc; a copy control management data (DGCCI) detector 5 for detecting digital copy control management information (DGCCI) from the system stream; an AV decoder 6 for converting the system stream to a digital audio or digital video signal; a watermark (WMCCI) decoder 7 for reading out WMCCI data from the digital audio or digital video signal outputted from the AV decoder 6; an analogue output circuit 8 for converting the digital audio or digital video signal into an analogue signal to be outputted; and a digital output circuit 9 for converting a format of the digital audio or digital video signal into a signal of a definite output format (for example, IEC60958, IEEE1394 and the like) to output the signal.

Meanwhile, an authorized optical disc recorder 18 includes: an analogue input circuit 11 having a function of converting an analogue audio or video input signal into a digital signal; a digital input circuit 12 having a function of converting a signal which is input in a definite digital format into a digital audio or digital video signal; a watermark (WMCCI) decoder/encoder 15 for detecting a watermark signal (WMCCI) from the digital audio or digital video signal and rewriting the WMCCI when necessary; an AV encoder 14 having a function of converting the digital audio or digital video signal into a system stream; a recording control section 13 for servo-controlling an optical pickup and an working mechanism relating to recording of an optical disc; copy control management data (CCM) detector/rewriter 16 for detecting digital copy control management information (DGCCI) from the system stream and rewriting the DGCCI when necessary; and an encryption generator 17 for generating and adding an encryption to the system stream.

As for the commercially available press disc 1, the authorized optical disc player 10 reproduces an audio or video signal from the disc, which is digitally or analoguely connected to the authorized optical disc recorder 18 to thereby create a copy disc 2. In the case of digital connection, both WMCCI data and DGCCI data are included in connection, only WMCCI data is included in the analogue contents data. The contents data includes encryption data embedded therein to enable the decryption of data packets carried together with the contents data signal.

Figure 2:
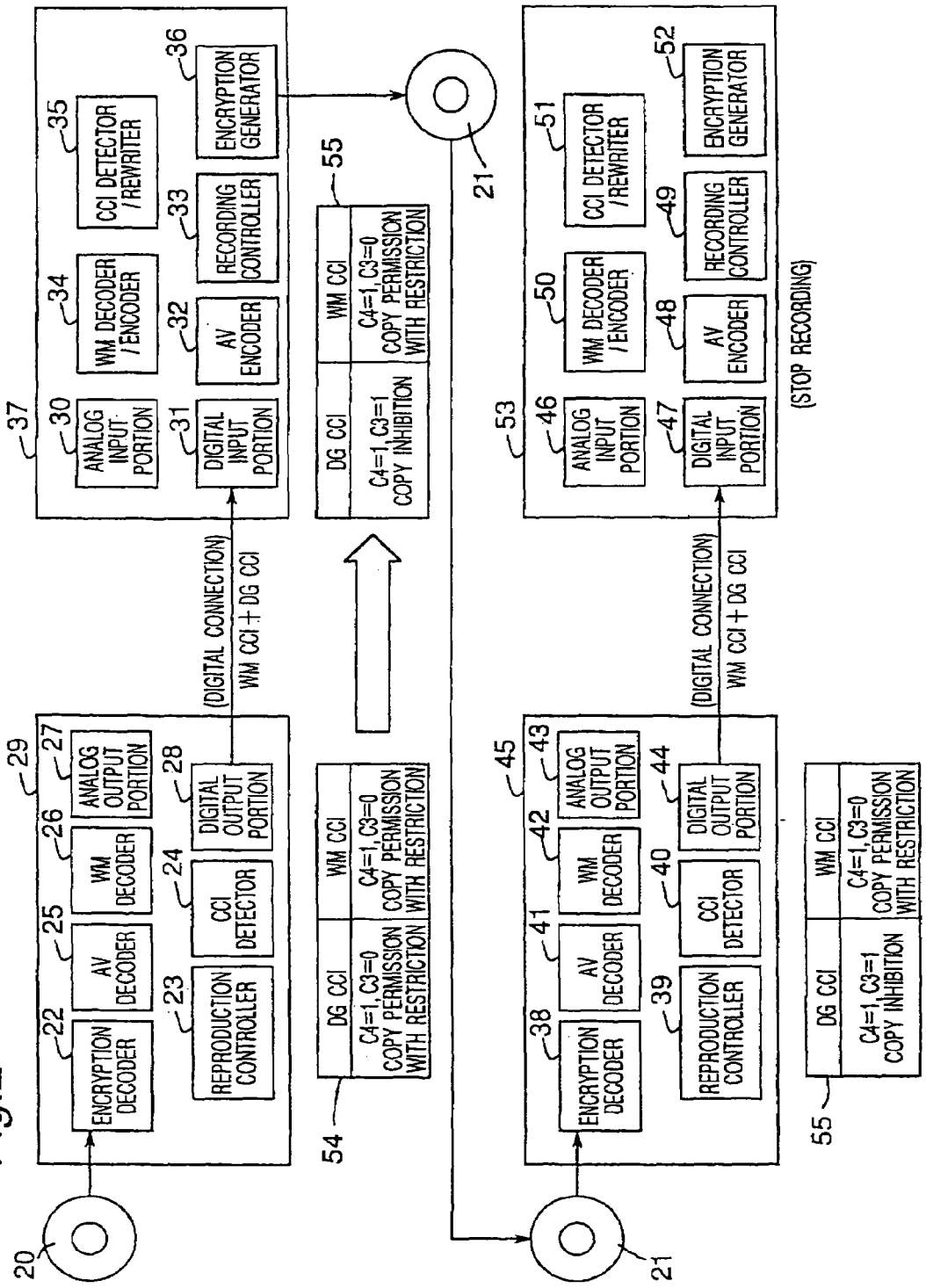
FIG. 2 is a block diagram in the case of authorized two generation digital recording in the same embodiment.

A case of authorized two generation recording in the present invention will be described with reference to FIG. 2. It is assumed that DGCCI and WACCI are recorded in the form as shown in FIG. 13 on a commercially available press disc 20, and the commercially available press disc 20 is under the condition with limitation that permits only one generation copy. This copy control management information (CCI) is shown by a block 54. In other words, in this commercially available press disc 20, C parameters of the DGCCI and the WMCCI shown in FIG. 13 represent the status "C4C3=10". When reproducing the commercially available press disc 20 with an authorized optical disc player 29, an encryption is decoded from a system stream by means of an encryption decoder 22 and DGCCI is detected by means of a copy control management data (CCI) detector 24, thereby discriminating that one generation copy is permitted. As a result of this, in the authorized optical disc player 29, a digital output circuit 24 converts a digital audio or digital video signal into a signal of a definite digital output format to output the signal.

When the digital signal outputted in the definite digital format is inputted to an authorized optical disc recorder 37 from the authorized optical disc player 29, the inputted digital signal is converted into a digital audio or video signal by a digital input circuit 31. The converted digital audio or video signal is then converted into a system stream by means of an AV encoder 32. From the system stream, a CCI detector/rewriter 35 detects DGCCI to confirm the C parameters of "C4C3=10" indicating that one generation copy is permitted. Thus, the C3 parameter of the DGCCI is rewritten from 0 to 1 to obtain "C4C3=11" so as to prohibit copy of second and subsequent generations. The copy control management information (CCI) is shown by a block 55. In addition, an encryption generator 36 generates and adds an encryption to the system stream and a recording operation is performed under a control of a recording controller 33, whereby a first generation copy disc 21 is created with the digital contents data including the CCI 55 recorded.

When reproducing the copy disc 21 by an authorized optical disc player 45, even though C parameters of the DGCCI are "C4C3=11" representing that copy is prohibited, reproduction is performed to output a system stream digital signal regardless of the copy prohibition. When this digital signal is inputted to an authorized optical disc recorder 53, a CCI detector/rewriter 51 detects the DGCCI to discriminate that copy is prohibited. Thus, the recording operation is controlled by the recording controller 49 to be stopped, whereby the recording operation is not performed. As a result of this operation, creation of a copy disc of second generation is prevented.

Figure 3:
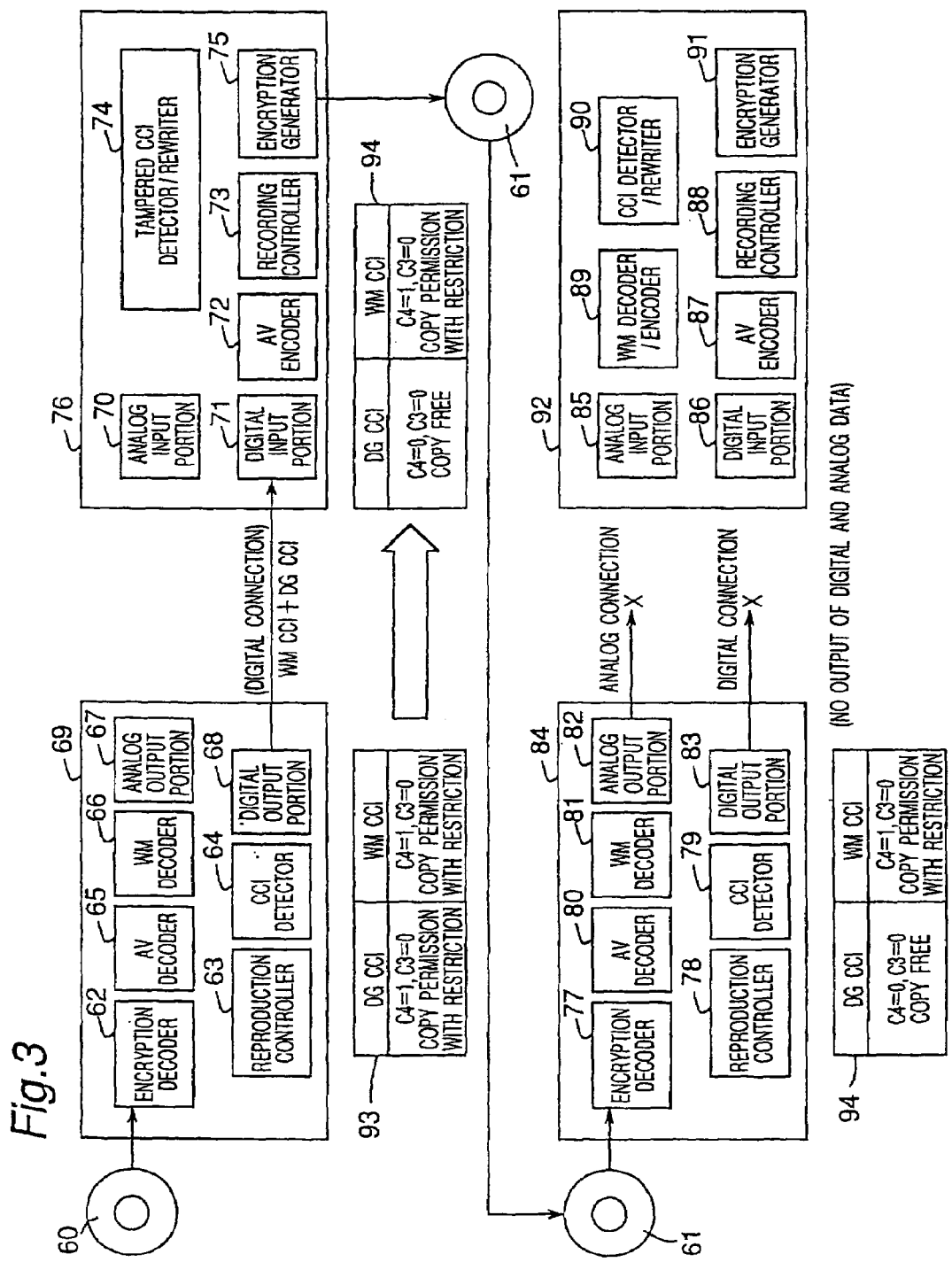
FIG. 3 is a block diagram in the case of unauthorized two generation digital recording in the same embodiment.

Next, a case of unauthorized two generation digital recording in the case where the CCI detector/rewriter of the optical disc recorder is tampered, will be describe with reference to FIG. 3. Likewise the commercially available press disc 20, an commercially available press disc 60 is under a condition with limitation that permits only one generation copy, and both DGCCI and WMCCI satisfy "C4C3=10", and the status of CCI thereof is shown by a block 93. When reproducing the commercially available press disc 60 using an authorized optical disc player 69, the DGCCI is detected by a CCI detector 64 and it is discriminated that one generation copy is permitted. Hence, a digital output circuit 68 converts the digital audio or video signal into a signal of a definite digital output format to be generated.

When the digital signal outputted from the authorized optical disc player 69 in the definite digital format is inputted to an unauthorized optical disc recorder 76 which does not have a WM decoder/encoder but which has a tampered CCI detector/rewriter (74), the inputted digital signal of a definite format is converted in format into a digital audio or video signal by a digital input circuit 71. The converted digital audio or video signal is then converted into a system stream by means of an AV encoder 72. For the system stream, a tampered CCI detector/rewriter 74 detects DGCCI and confirms the status "C4C3=10" representing one generation copy permissible. The tampered CCI detector/rewriter 74 tampers the DGCCI data to make setting for copy free "C4C3=00" though it should rewrite the C3 parameter of the DGCCI from 0 to 1 to make it into "C4C3=11" so as to prohibit copy of second and subsequent generations.

On the other hand, since there is no WM decoder/encoder in this unauthorized optical disc recorder 76, the WMCCI data will not be rewritten and remain "C4C3=10". Then, an encryption generator 75 adds an encryption of the tampered CCI to the system stream, and a recording controller 73 performs recording operation. Thus, there is obtained a one generation copy disc 61 of copy free excluding only copy limitation for the DGCCI data, which CCI of this case is shown by a block 94.

When the one generation copy disc 61 is reproduced by an authorized optical disc player 84, it is confirmed by passing the signal reproduced from the disc through an encryption decoder 77 that encryption has been added. It is also confirmed by a CCI detector/rewriter 79 that the DGCCI data represents "C4C3=00" which indicates copy free. As shown in FIG. 13, in the present invention, the reproduction is permitted only in the case where the DGCCI of an encrypted audio or video data is in the condition of copy permissible with restriction or copy prohibition, while reproduction is not permitted in the case of copy free condition. Therefore, when the digital CCI is of copy free, it is judged as an illegal disc. As the result, a digital output circuit 83 is controlled to mute only digital signal output, or both the digital output circuit 83 and analogue output circuit 82 are controlled to mute both digital and analogue signal output, or a command is sent to a reproduction controller 78 to stop the reproducing operation.

In a preferred embodiment, in the case where reproduction condition is not satisfied based on the DGCCI or WMCCI, the system controller may display an error message on the display section or video output section.

In this way, even if a copy free disc is created by a tampered unauthorized optical disc recorder, it is possible to prevent digital copy discs of second and subsequent generation from being created by the use of the optical disc copy control system of the present invention.

Figure 4:
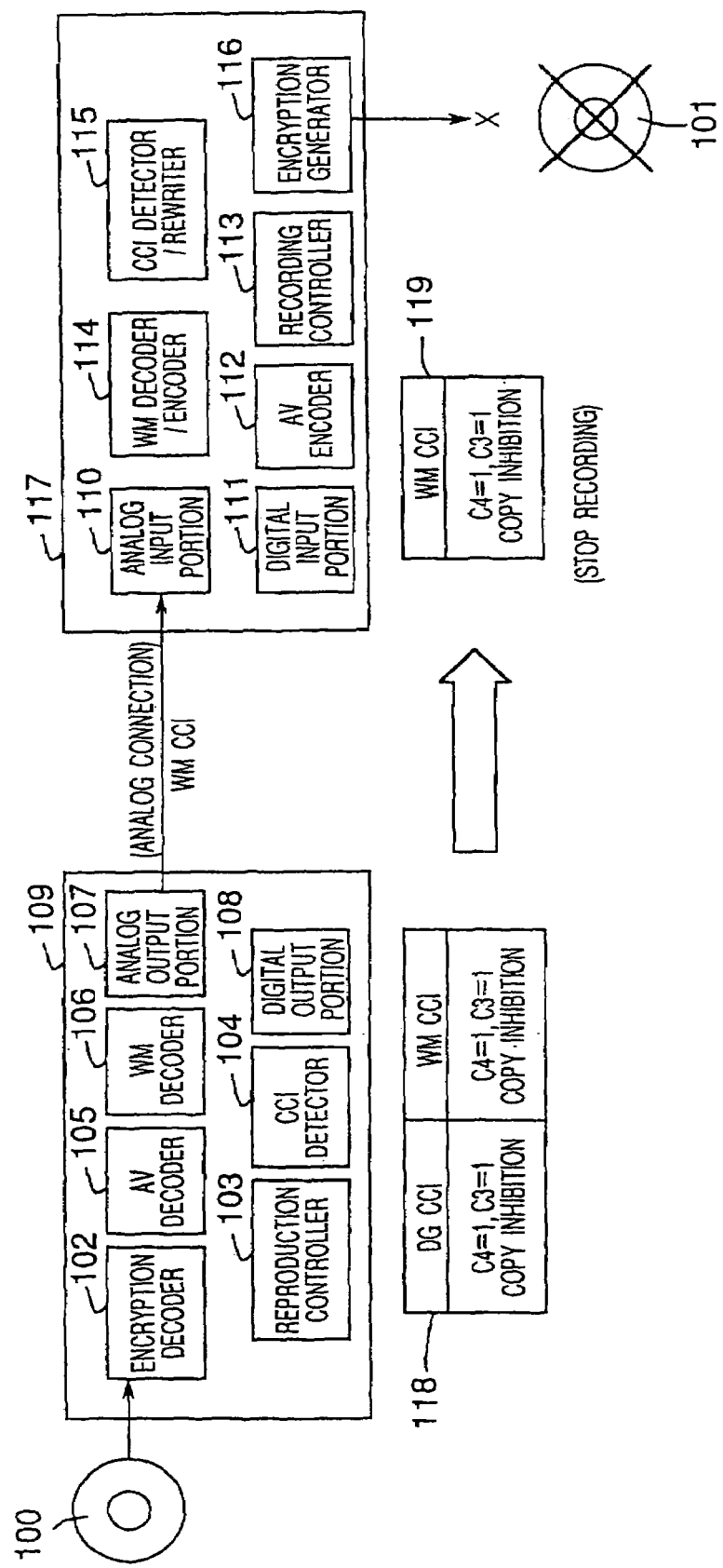
FIG. 4 is a block diagram in the case of authorized two generation analogue recording in the same embodiment.

Next, a case of authorized two generation recording in the present invention will be described with reference to FIG. 4. It is assumed that DGCCI and WMCCI are recorded in the form as shown in FIG. 13 on a commercially available press disc 100, and the commercially available press disc 100 is under the condition of prohibiting copy, of which the CCI is shown by a block 118. In other words, in this commercially available press disc 100, C parameters of the DGCCI and WMCCI shown in FIG. 13 represents "C4C3=11". When reproducing the commercially available press disc 100 using an authorized optical disc player 109, an encryption is decrypted from a system stream by means of an encryption decoder 102, and then the DGCCI is detected by means of a CCI detector 104, thereby confirming that one generation copy is prohibited. Although the DGCCI represents copy inhibition, the reproduction is performed regardless thereof to reproduce a system stream. The reason why the player normally performs a reproducing operation without stopping the reproduction even if copy is prohibited is that, it is impossible to authorize equipments to be connected, and the equipments to be connected to the digital output are not limited to a recorder but may be an audio/video reproducing equipment with a digital input (such as for example, digital TV and digital amplifier). As a result of this, in the authorized optical disc player 109, an analogue output circuit 107 outputs an analogue audio or video signal and a digital output circuit 108 converts a digital audio or video signal into a signal of a definite digital output format to be generated.

When the digital signal outputted in the definite digital format is inputted into an authorized optical disc recorder 117 from the authorized optical disc player 109, the inputted digital signal is converted into a digital audio or digital video signal by means of a digital input circuit 110. The converted digital audio or video signal is then converted into a system stream by means of an AV encoder 112. For the converted system stream, a WM decoder 114 detects the WMCCI data of the CCI 118, and since the CCI indicates copy prohibition, the recording operation is not performed. Namely, an encryption generator 116 does not generate an encryption to be added, and as a result of this, a first generation copy disc 101 will not be created. The CCI detected in the disc player 117 is shown by a block 119.

Figure 5:
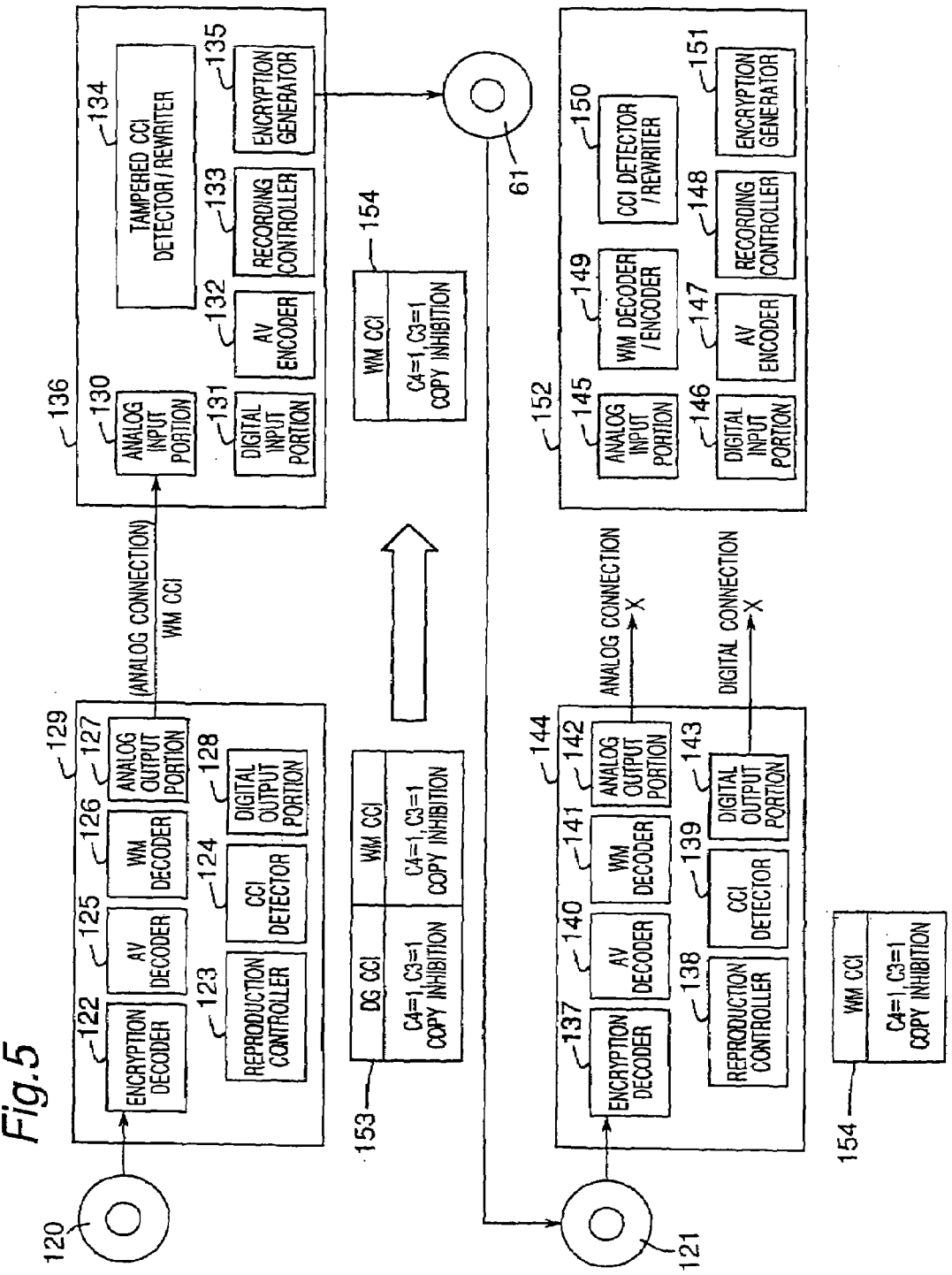
FIG. 5 is a block diagram in the case of unauthorized two generation analogue recording in the same embodiment.

Next, a case of unauthorized two generation recording in the present invention will be described with reference to FIG. 5. It is assumed that DGCCI and WMCCI are recorded in the form as shown in FIG. 13 on a commercially available press disc 120, and the commercially available press disc 120 is under the condition of prohibiting copy. This CCI is shown by a block 153. In other words, in this commercially available press disc 120, C parameters of the DGCCI and the WMCCI shown in FIG. 13 represent "C4C3=11". When reproducing the commercially available press disc 120 using an authorized optical disc player 129, an encryption is decrypted from a system stream by means of an encryption decoder 122 and then DGCCI is detected by means of a CCI detector 124, thereby confirming that one generation copy is prohibited. Though the CCI represents copy inhibition, the reproduction is performed regardless of this, and a system stream digital signal is outputted. As a result of this, in the authorized optical disc player 129, an analogue output circuit 127 outputs an analogue audio or analogue video signal and a digital output circuit 128 converts a digital audio or digital video signal into a signal of a definite digital output format to be generated.

When the analogue signal outputted from the authorized optical disc player 129 is inputted to an unauthorized optical disc recorder 136, the inputted analogue signal is converted into a digital audio or digital video signal by means of a analog input circuit 130. The converted digital audio or digital video signal is then converted into a system stream by means of an AV encoder 132. The converted system stream does not include DGCCI but includes only WMCCI data recorded because the input signal is analogue. However, since there is no WM decoder and a CCI detector/rewriter 134 is tampered, even if copy inhibition is defined by the WMCCI data, the definition is ignored and a first generation copy disc 121 is created. The CCI detected in the disc recorder 136 is as shown by a block 154.

In the case of reproducing the unauthorized copy disc 121 with an authorized optical disc player 144, an encryption decoder 137 decrypts the encryption, and DGCCI data is detected from the decoded system stream by means of a CCI detector 139. However, since no DGCCI data is recorded on the system stream, WMCCI data is detected by means of a WM decoder 141. Then, it is confirmed that there is no DGCCI data and that the WMCCI data represents copy prohibition "C4C3=11". As to be described later in connection with steps S9 to S11 shown in FIG. 12, in the present invention, when there is no DGCCI data and the WMCCI data represents copy prohibition, the disc is judged as an unauthorized copy disc. As the result, a digital output circuit 143 is controlled to mute only digital signal output, or the digital output circuit 143 and analogue output circuit 142 are both controlled to mute both digital signal output and analogue signal output, or a command is sent to a reproduction controller 138 to stop the reproducing operation per se. In this way, even if an unauthorized disc is created by a tampered unauthorized optical disc recorder, it is possible to prevent analogue or digital copy discs of second and subsequent generation from being created by the optical disc copy control system of the present invention.

Figure 6:
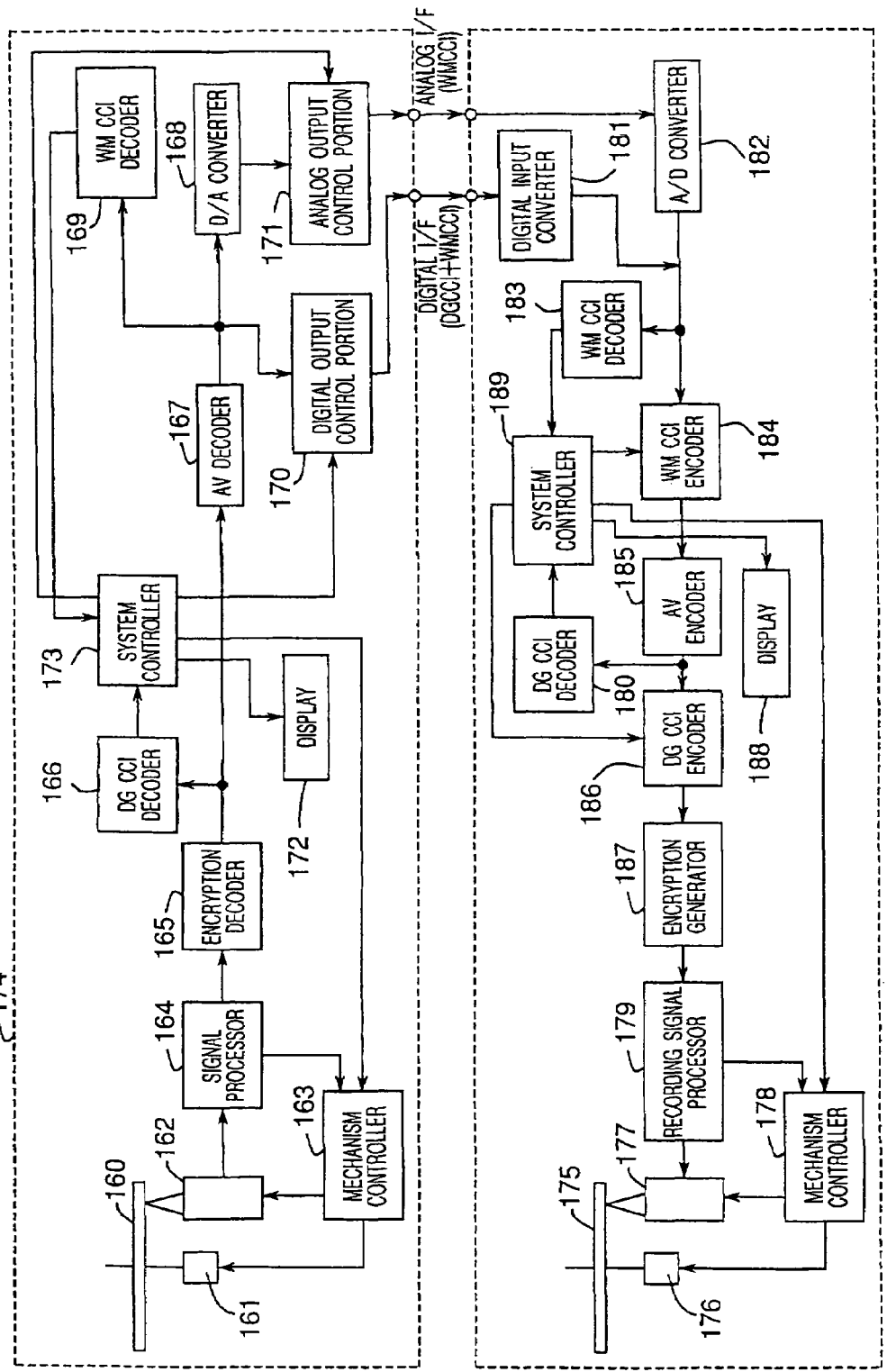
FIG. 6 is a block diagram of an optical disc reproducing and recording apparatus in the same embodiment.

Next, a concrete example of a reproducing and recording apparatus employing the copy control method of an optical disc according to the present invention will be described with reference to FIG. 6, and further description will be made on a digital recording operation and analogue recording operation.

An optical disc player 174 includes: a spindle motor 161 for rotating a disc 160; an optical pickup 162 for reading a signal recorded on the disc 160; a mechanism control section 163 for driving and controlling the spindle motor 161 and the optical pickup 162; a signal processing section 164 which extracts a system stream digital signal by performing data punching or error correcting of the output of the optical pickup 162 and supplies a control signal to the mechanical controlling section 163; an encryption decoder 165 for decoding an encryption from the system stream; a DGCCI decoder 166 for detecting DGCCI from the encryption-decoded system stream; an AV decoder 167 for extracting a digital audio or digital video signal from the encryption-decoded system stream and decoding the signal; a WMCCI decoder 169 for reading out WMCCI data from the digital audio or video signal output of the AV decoder 167; a DA converter 168 for converting the digital audio or video signal into an analogue audio or video signal; a digital signal output control section 170 for converting the digital audio or video signal into a signal of a definite I/F output format (for example IEC60958, IEEE1394 and the like) to perform an output control; an analogue signal output control section 171 for performing an output control of the analogue audio or video signal; a display section 172 for displaying an operation state; and a system controller 173 for controlling the digital signal output control section 170 and analogue signal output control section 171 while reading the WMCCI and DGCCI data, and also controlling the display section 172 and the mechanism control section 163. The system controller 173 may include a copy permissibility decision portion for deciding whether or not a copy is permissible according to an output of the CCI detector (166, 169). The system controller also may be formed of, e.g., a microcomputer.

Meanwhile, an optical disc recorder 190 includes: a spindle motor 176 for rotating a recording disc 175; an optical pickup 177 for recording a signal encoded by a recording signal processing section 179 to the recording disc 175; a mechanism control section 178 for driving and controlling the spindle motor 176 and the optical pickup 177. The recording signal processing section 179 supplies a recording signal to the optical pickup 177 while adding an error correcting code to a system stream having an encryption added thereto and performing modulation on the same, and supplies a control signal to the mechanism control section 178 at the time of recording. The disc recorder 190 further includes; a digital input converting section 181 for converting a definite digital signal outputted from the outside into a digital audio or video signal; a WMCCI decoder 183 for reading out WMCCI data from the digital audio or video signal; a WMCCI encoder 184 for rewriting the WMCCI data of the digital audio or video signal in accordance with a command of a system controller 189; an AD converter 182 for converting an analogue audio or video input signal into a digital signal; an AV encoder 185 for encoding the digital audio or video signal into a system stream; a DGCCI decoder 180 for detecting DGCCI from the system stream signal; a DGCCI encoder 186 for rewriting DGCCI data carried on the system stream signal in accordance with a command of the system controller 189; an encryption generator 187 for generating an encryption by adding an encryption to the system stream and transferring the encrypted system stream to the recording signal processing section 179; and a display section 188 for displaying an operation state. The system controller 189 reads the DGCCI data and provides the DGCCI encoder 186 with a command to rewrite the DGCCI data, and also controls the mechanism control section 178.

Next, a digital reproducing and recording operation of the optical disc reproducing and recording apparatus configured as a digital connection will be described. The optical pickup 162 reads a signal recorded on the disc 160, and the signal processing section 164 performs data punching and error correcting to extract a system stream digital signal while supplying a control signal to the mechanism controlling section 163 with. The encryption decrypts the encryption from the system stream decoder 165 and the output thereof is supplied to the DGCCI decoder 166 and the AV decoder 167. The AV decoder 167 extracts a digital audio or video signal from the system stream and decodes the same, and the decoded signal output thereof is supplied to the WMCCI decoder 169 and the digital signal output control section 170. The digital signal output control section 170 converts the digital audio or video signal into a signal of a definite I/F output format (such as for example, IEC60958 and IEEE1394). Meanwhile, the DGCCI decoder 166 decodes the DGCCI data from the system stream and the output thereof is supplied to the system controller 173. The WMCCI decoder 169 decodes the WMCCI data from the digital audio or video signal and the decoded WMCCI data is supplied to the system controller 173. The system controller 173 receives both the DGCCI data and the WMCCI data and controls the digital signal output control section 170 and the mechanism control section 163 in accordance with the received CCI data. The system controller 173 also transfers operation display information to the display section 172.

In specific, in the case where a reproduction condition is not satisfied by the copy controlling management information of the DGCCI or WMCCI, the system controller displays an error message on the display section or video output section, and since a certain error message regarding illegal disc is displayed on the display or video output section to which the video signal is connected, it is possible to inform the user of the reason why a normal reproduction state is not achieved and thus inform the user that it is not a failure of the optical disc player to thereby eliminate user's anxiety, so that it is possible to prevent occurrences of unnecessary user's claims.

A definite digital signal inputted to the optical disc recorder 190 from the outside is converted into a digital audio or video signal by the digital input converting section and transferred to the AV encoder 185. The AV encoder 185 encodes the digital audio or video signal into a system stream. The DGCCI decoder 180 detects DGCCI data from the system stream signal and this DGCCI data is supplied to the system controller 189. The system controller 189 reads the DGCCI data and provides the DGCCI encoder 186 with a command to rewrite the DGCCI data carried on the system stream, when necessary, and also controls the mechanism control section 178. The system stream output of the DGCCI encoder 186 is encrypted by the encryption generator 187, and then the recording signal processor 179 adds an error correcting code and perform modulation on the encrypted system stream, which the resultant signal is supplied to the optical pickup 177 and is recorded on the recording disc 175. At this time, both the DGCCI data and the WMCCI data included in the system stream are also recorded on the recording disc 175.

Next, analogue reproducing and recording operation in the analogue connection configuration of the present invention will be described. The optical pickup 162 reads a signal recorded on the disc 160, and the signal processing section 164 performs data punching and error correcting to extract a system stream digital signal while supplying a control signal to the mechanism control section 163. The encryption decoder 165 decodes the encryption on the system stream and the encryption-decoded system stream is supplied to both the DGCCI decoder 166 and the AV decoder 167. The AV decoder 167 extracts a digital audio or video signal from the system stream and decodes the same, and the decoded signal is supplied to the DA converter 168, the WMCCI decoder 169 and the digital signal output control section 170. The DA converter 168 converts the digital audio or video signal into an analogue signal to be supplied to the analogue signal output controlling section 171. The WMCCI decoder 169 decodes the WMCCI data from the digital audio or video signal and the decoded WMCCI data is supplied to the system controller 173.

Meanwhile, the digital CCI decoder 166 decodes the DGCCI data from the system stream and the decoded DGCCI data is supplied to the system controller 173. The system controller 173 reads both the DGCCI data and the WMCCI data and controls the analogue signal output control section 171 and the mechanism control section 163 in accordance with the received CCI data. The system controller 173 also transfers operation display information to the display section 172 similarly to the case of the digital connection configuration.

In the analogue recording operation, the analogue signal inputted to the optical disc recorder 190 from the outside is converted into a digital audio or video signal by the AD converter 182 and transferred to the WMCCI decoder 183. The WMCCI decoder 183 detects the WMCCI data from the digital audio or video signal and this detected WMCCI data is supplied to the system controller 189. The system controller 189 reads the WMCCI data and provides the WMCCI encoder 184 with a command for rewriting the WMCCI data on the system stream, when necessary. The system stream having WMCCI encoded is then transferred to the AV encoder 185, and the AV encoder 185 encodes the digital audio or video signal into a system stream. Then, the system controller 189 controls the mechanism control section 178. Regarding the system stream, encryption is generated by the encryption generator 187; an error correcting code is added and modulation is made by the recording signal processing section 179; and then the resultant recording signal is supplied to the optical pickup 177; and the system stream is recorded on the recording disc 175. At this time, only the WMCCI data is recorded on the recording disc 175.

Figure 7:
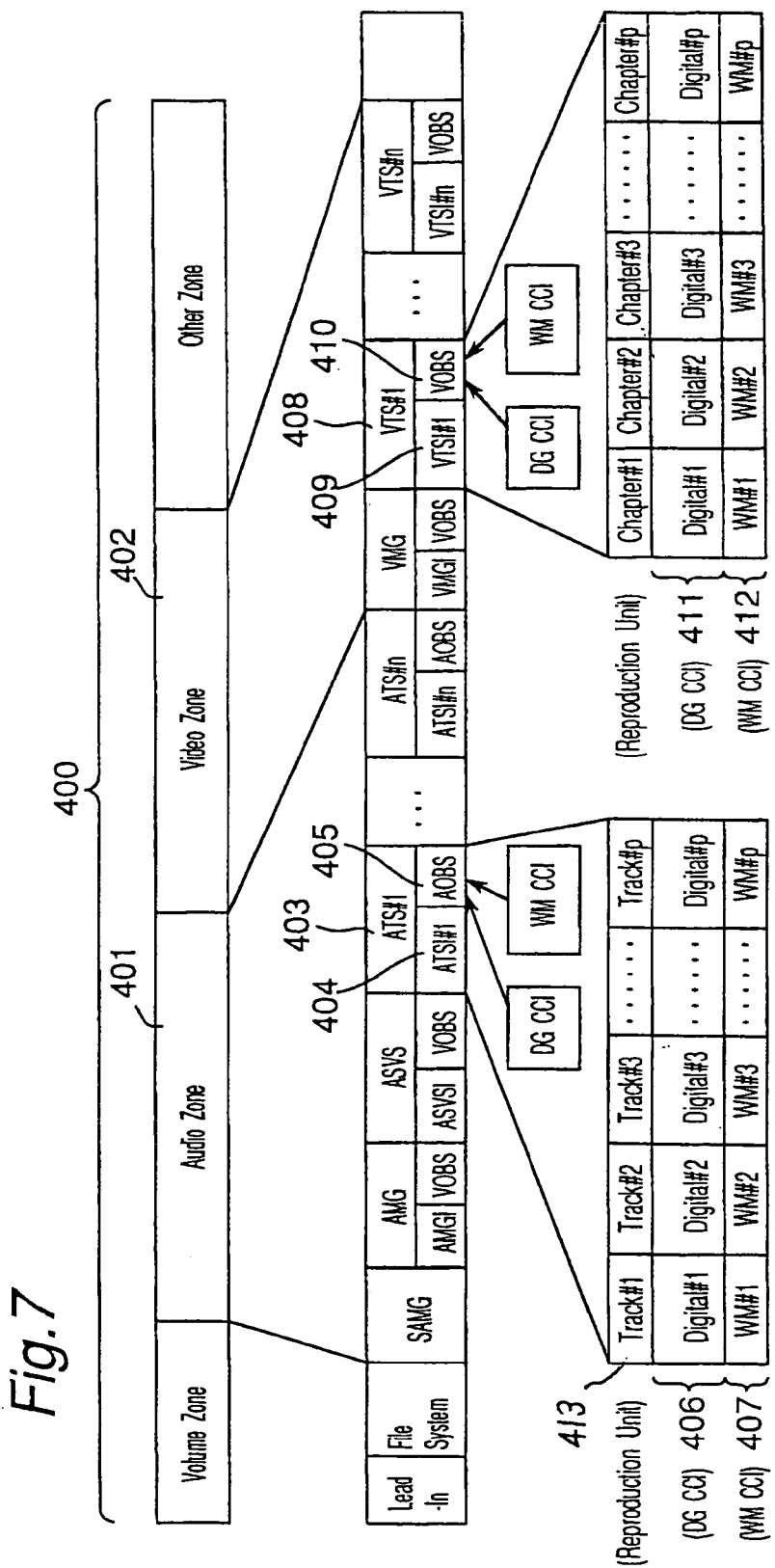
FIG. 7 is a view showing CCI data on disc file structure in the same embodiment.

Next, CCI data arrangement on the disc file structure in the present invention will be described with reference to FIG. 7. A disc 400 includes mainly four zones, i.e., VolumeZone, AudioZone, VideoZone and OtherZone, and among which, CCI data of audio contents and video contents are written in AudioZone 401 and VideoZone 402, respectively. AudioZone 401 includes a plurality of audio title sets ATS (regions 403), and each audio title set ATS (403) includes an audio title set management information storage area ATSI (404) and an audio data object collection AOBS (405). The audio data object collection AOBS includes a plurality of audio contents as reproduction units (Tracks#1 to #p) and the DGCCI data (Digitals#1 to #p 406) and WMCCI data (WM#1 to WM#p 407) are included therein corresponding to the respective reproduction units of the audio contents. In FIG. 7, ATS#1 403 includes ATSI#1 404 and AOBS 405, and AOBS 405 includes p pieces of Tracks #1 to #p as the reproduction units of the audio contents.

Likewise, also VideoZone 402 includes DGCCI data 411 and WMCCI data 412 with respect to audio/video contents for each Chapter which is regarded as a reproduction unit.

Figure 8:
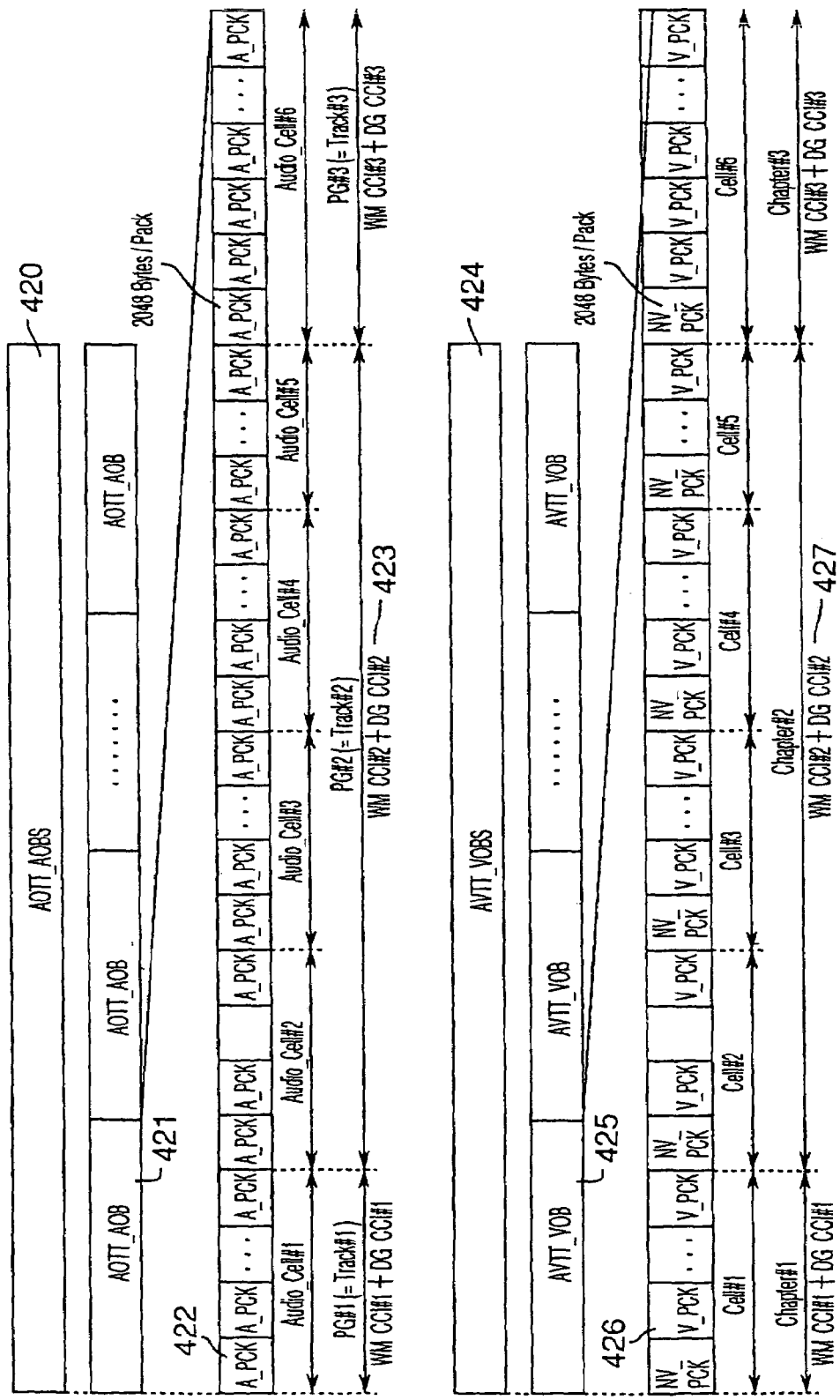
FIG. 8 is a view showing a relationship between object reproduction units and CCI data in the same embodiment.

Next, a relationship between an object reproducing unit and CCI data will be describe with reference to FIG. 8. Audio data object collection AOTT_AOBS 420 includes a plurality of audio data objects AOTT_AOB 421. The audio data object AOTT_AOB 421 includes a plurality of audio packs A_PCK 422, plural (a certain number of) audio packs A_PCK 422 constitute an Audio_Cell, and each Track (PG) as a reproduction unit is comprised of one or more Audio_Cells. For each reproduction unit, the WMCCI and DGCCI are designated.

Also as for video title set collection AVTT_VOBS 424, Chapter as a reproduction unit is composed of one or more Cells. For each reproduction unit, WMCCI and DGCCI designated by reference numeral 427 are allocated thereto.

Next, CCI data arrangement on the object data structure of the present invention will be described with reference to FIG. 9 which shows an example in the case of audio data. Audio data object collection AOTT_AOBS 430 is comprised of a plurality of audio data objects AOTT_AOB 431. Each of the audio title set AOTT_AOB 431 includes a plurality of audio packs A_PCK 432, and further each of the audio pack A_PCK 432 includes PrivateHeader 433 and Audio data 435. The Private Header 433 includes DGCCI 434, and the Audio data 435 includes WMCCI data encoded therein. A plurality of audio packs A_PCK 432 constitute Audio_Cell 436, and assembly of plural Audio_Cells 436 constitutes each Track (PG) 437 which is used as a reproduction unit. In this data structure, a PTS region is for writing reproduction time information, a region of sub_stream_id is for writing a stream type, a region of first_access_unit_pointer indicates a first byte of Audio frame of A_PCK thereof, and the region 434 is for writing DGCCI.

In this reproduction unit Track 437, the contents of the DGCCI data 434 and contents of the WMCCI data are constant and will not change. In other words, DGCCI data and WMCCI data are allocated in pair corresponding to a Track unit.

Figure 12:
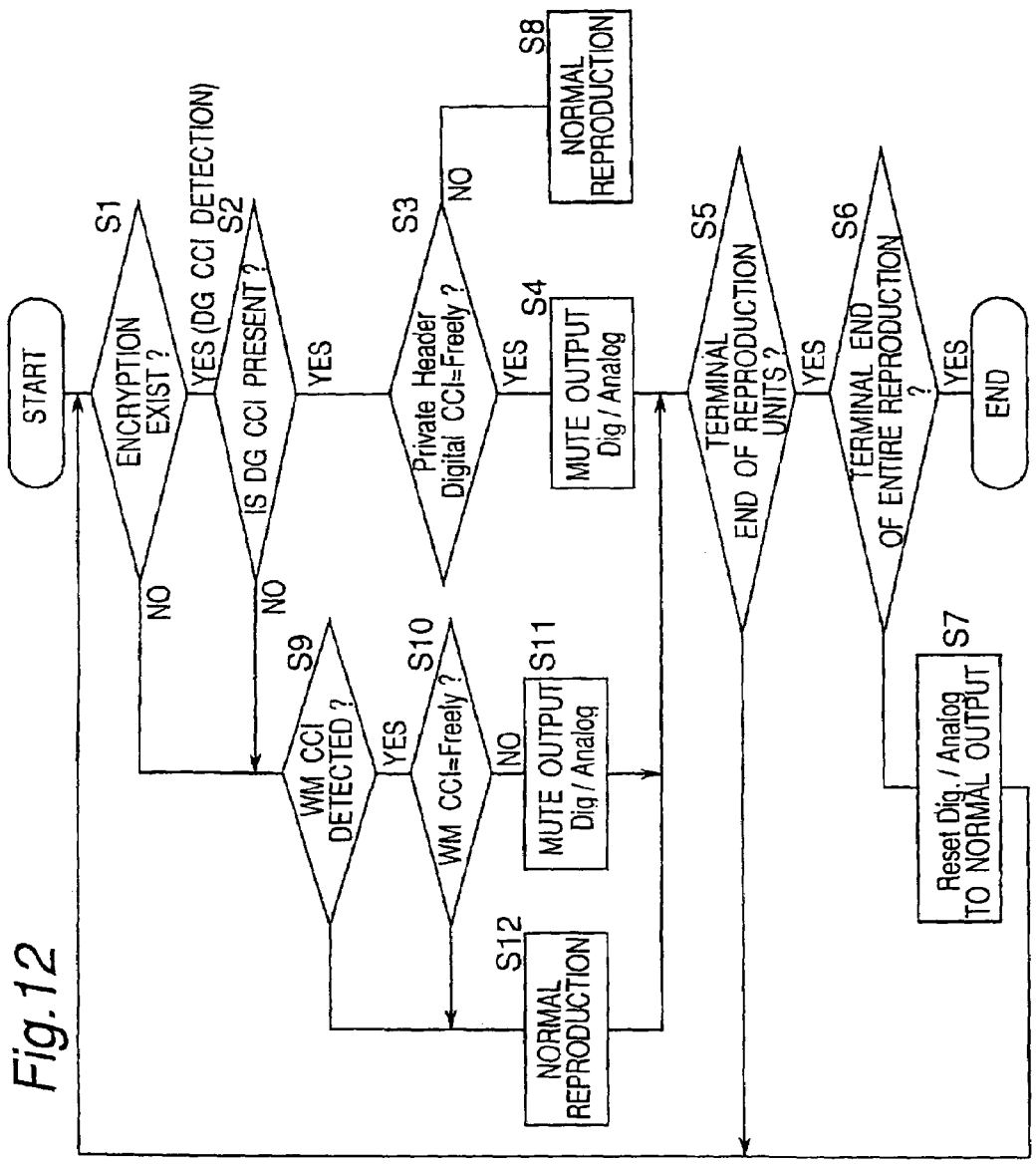
FIG. 12 is a CCI reproduction control flow chart of a player in the same embodiment.
Figure 14:
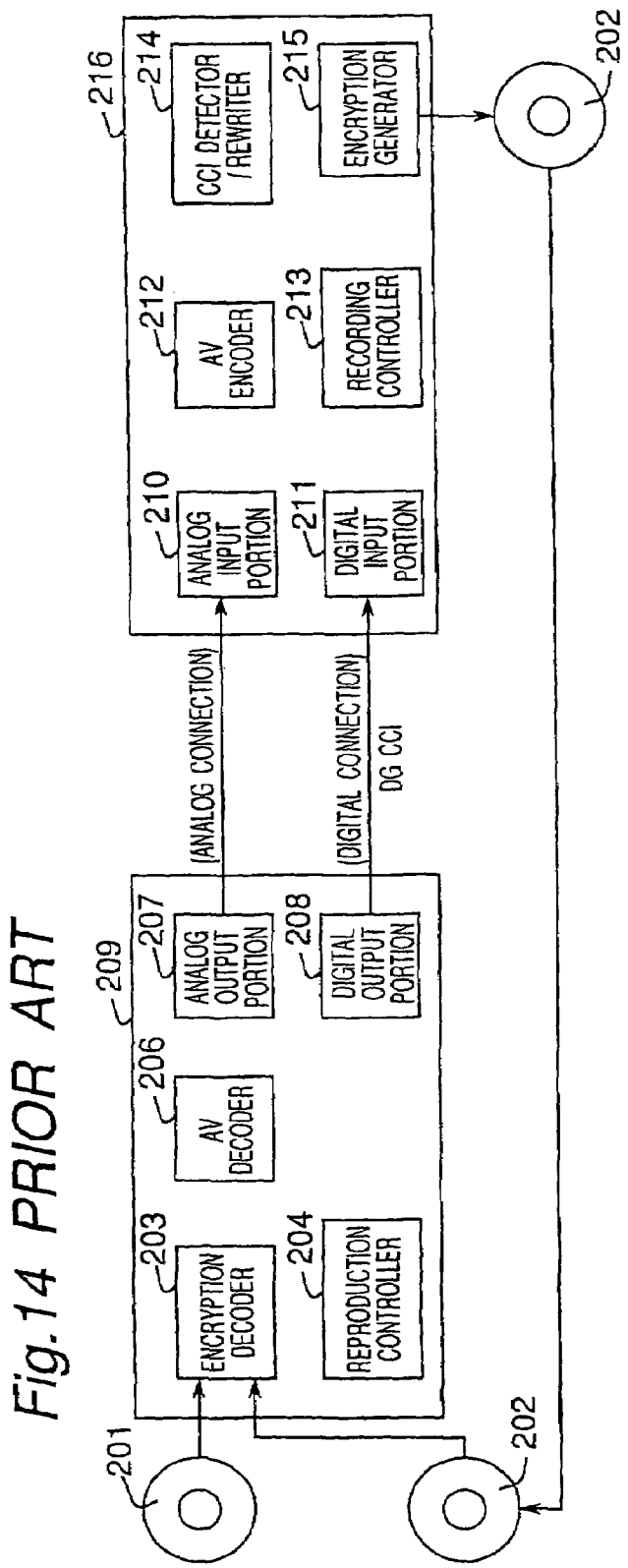
FIG. 14 is a block diagram showing a conventional copy control system of an optical disc.
Figure 15:
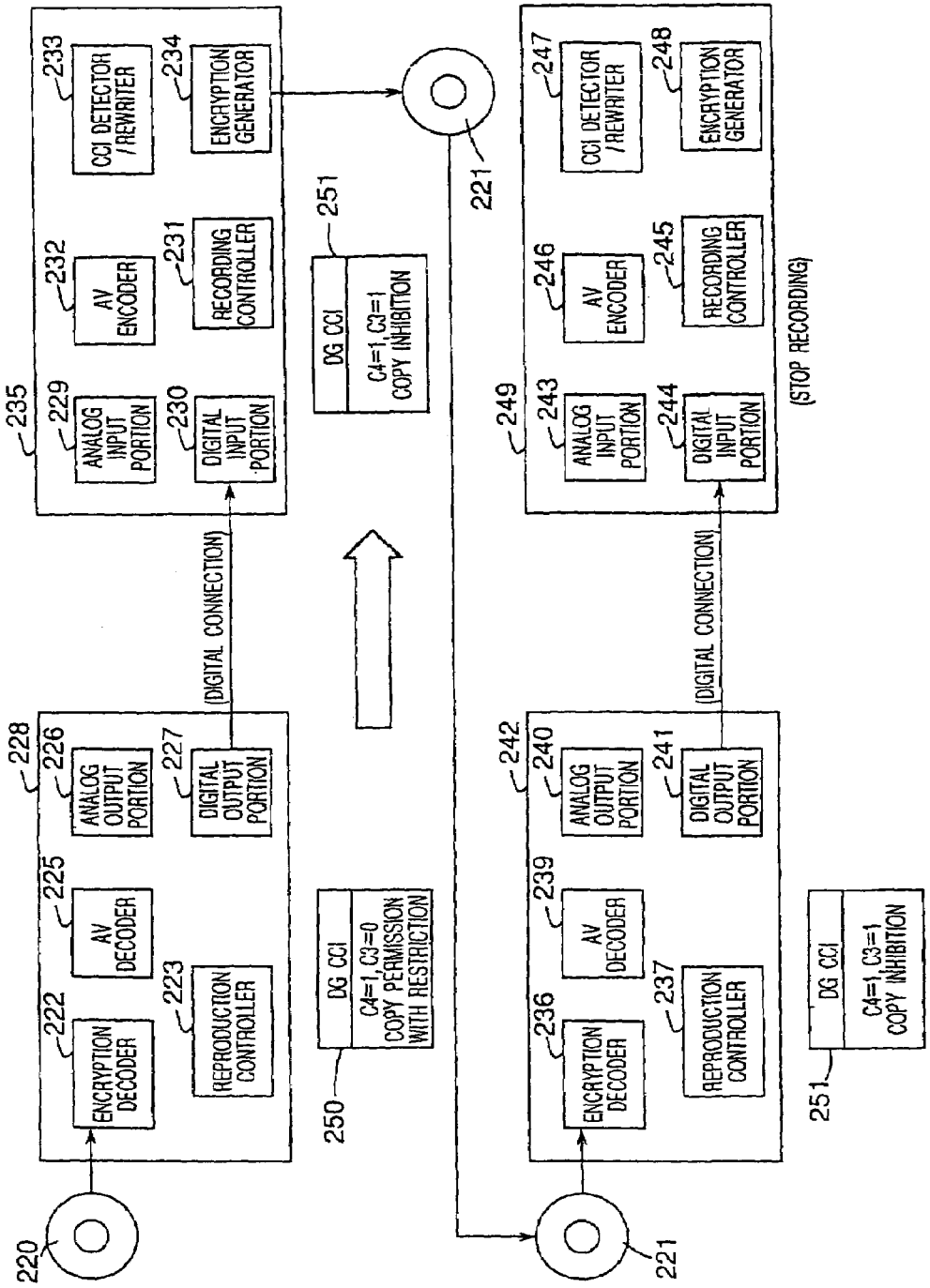
FIG. 15 is a block diagram of a conventional copy control system in the case of authorized two generation digital recording.
Figure 16:
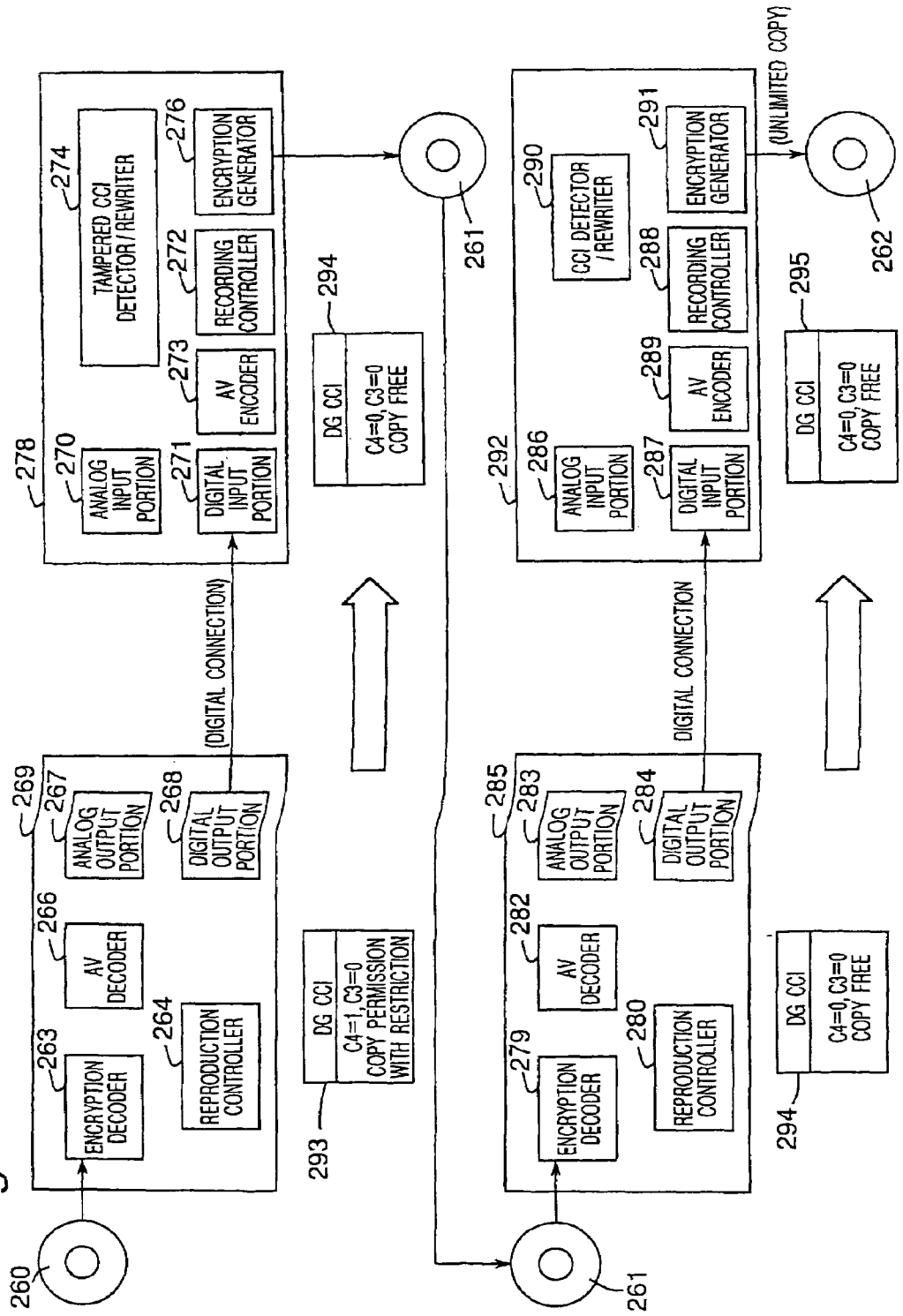
FIG. 16 is a block diagram showing a conventional copy control system in the case of unauthorized two generation digital recording.
Figure 17:
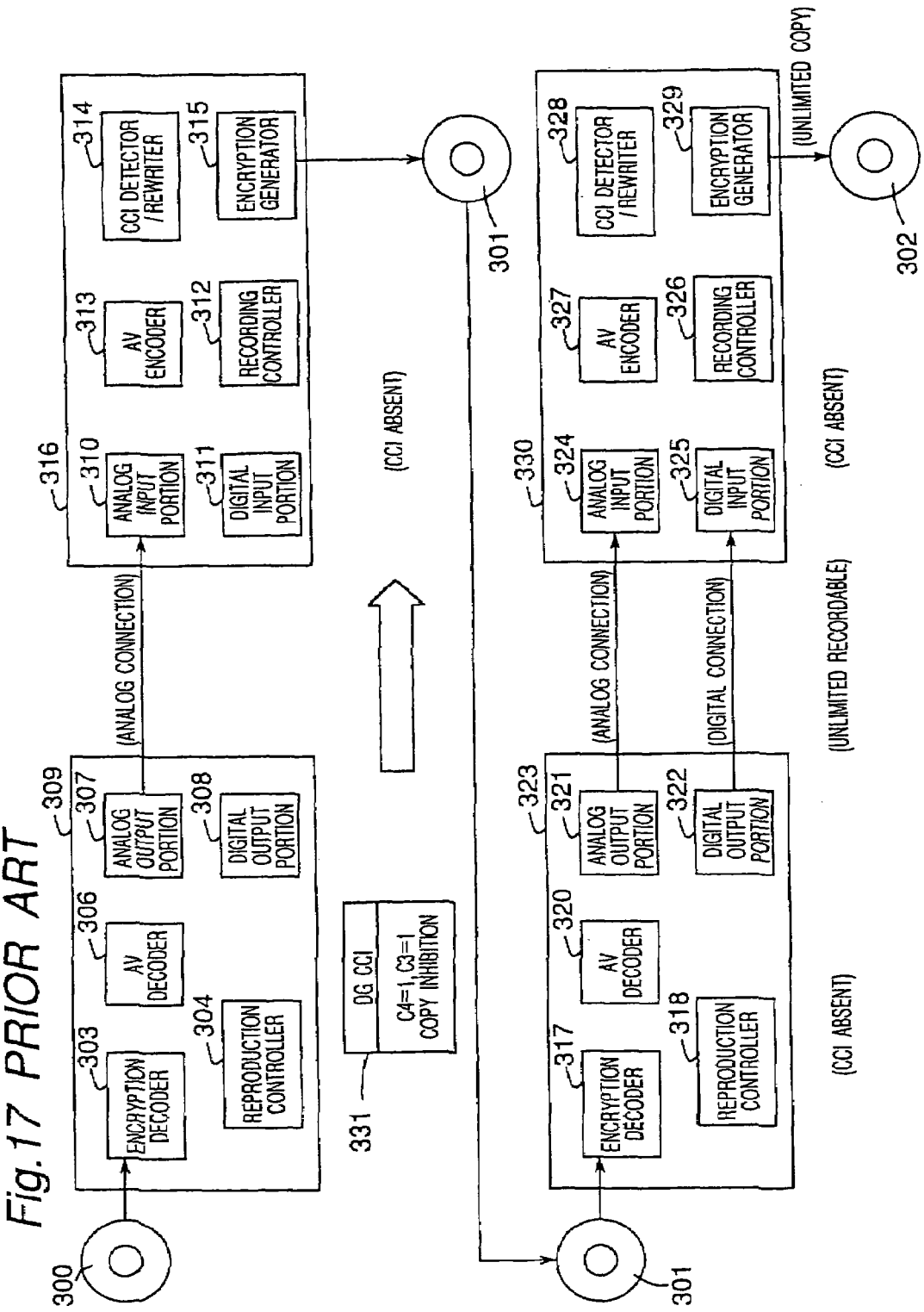
FIG. 17 is a block diagram showing a conventional copy control system in the case of two generation analogue recording in the conventional art.
Figure 18:
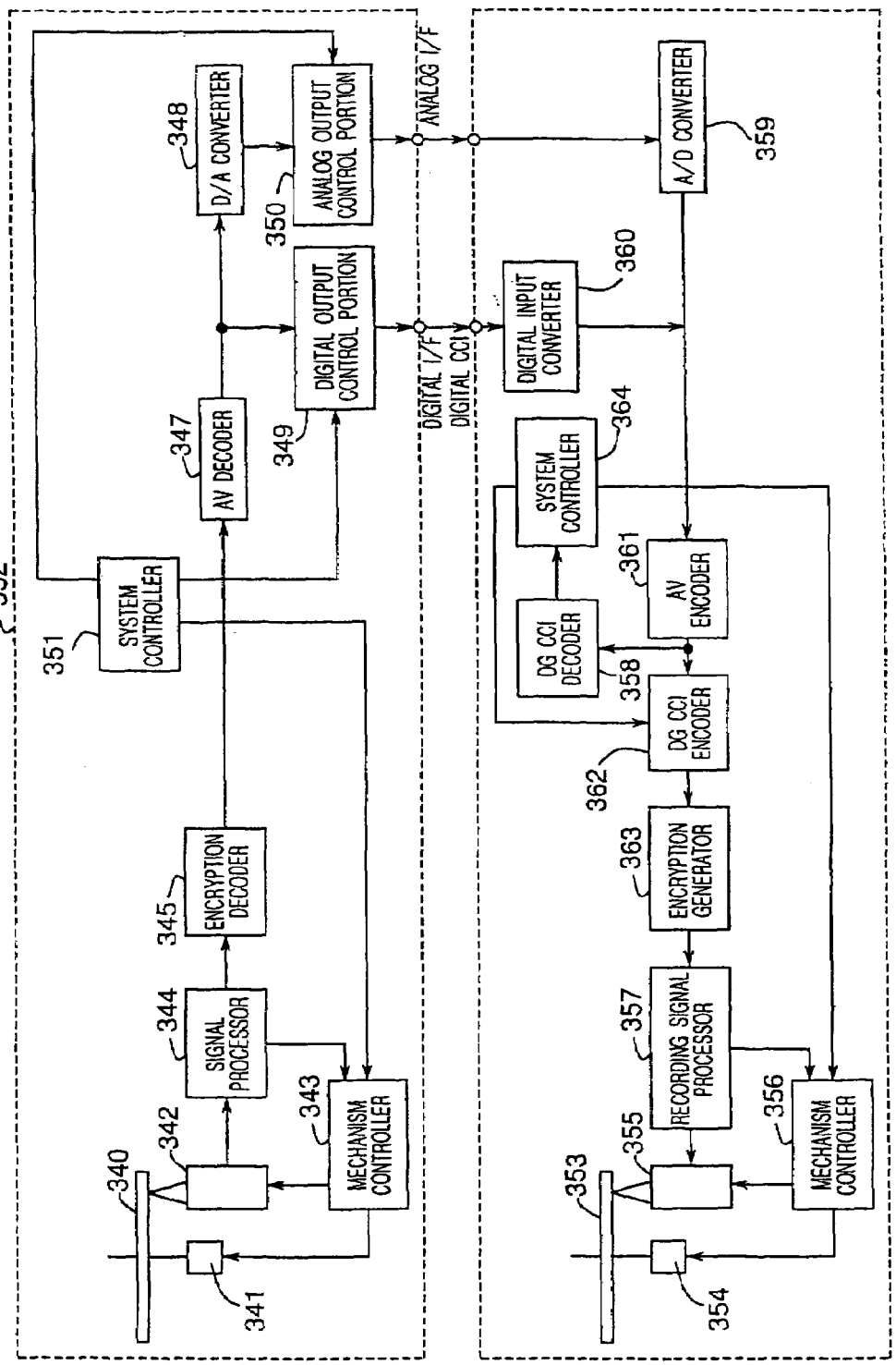
FIG. 18 is a block diagram showing a conventional optical disc reproducing and recording apparatus.
Figure 19:
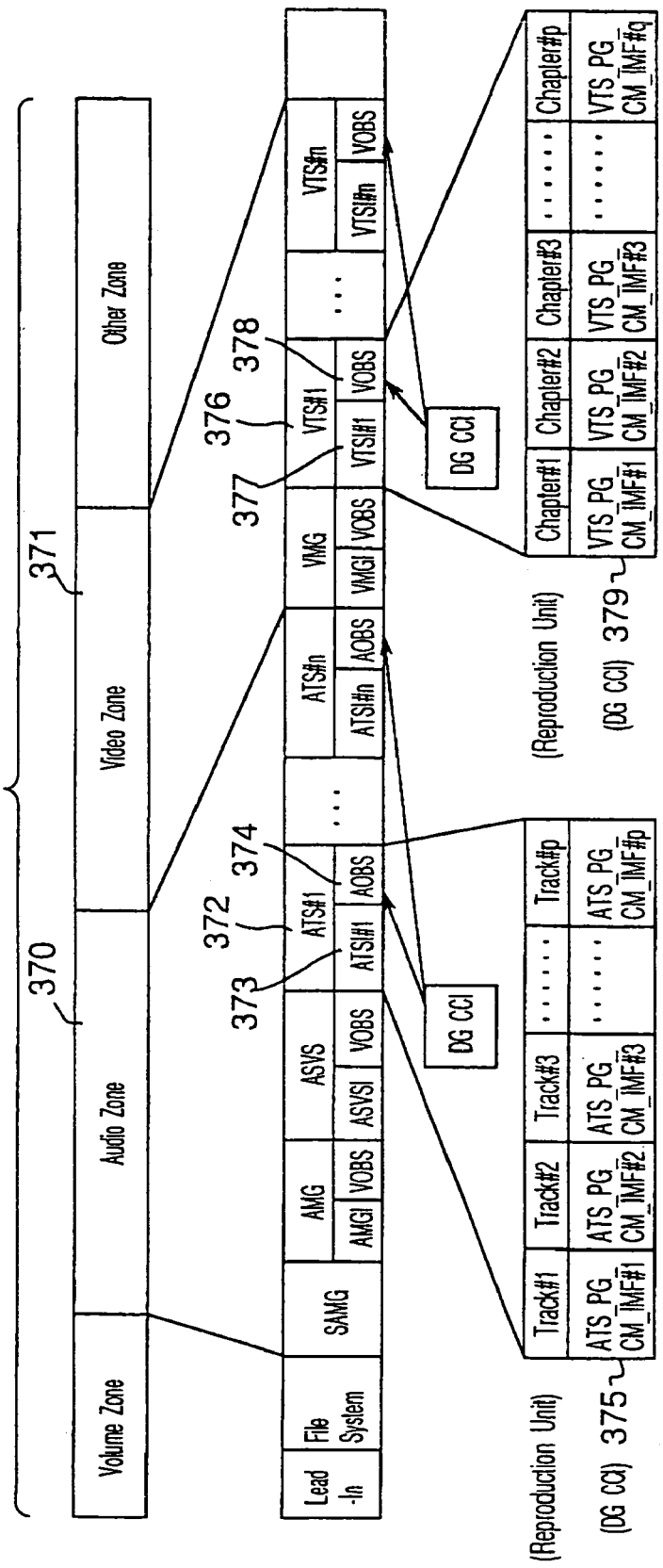
FIG. 19 is a view showing CCI data on disc file structure in the conventional art.

Next, one example of a reproduction control flow for executing copy control of an optical disc in the present invention configured as described above will be explained below with reference to FIG. 12.

First, a reproduction stream is supplied to an encryption decoder (165) to detect existence of encryption (step S1), and in the case where the encryption is detected, existence of DGCCI data is detected by means of the DGCCI decoder (step S2). In the case where there is DGCCI data, it is determined whether the DGCCI data is in a state of copy free or not (step S3). As shown in FIG. 13, in the present invention, the reproduction of encrypted audio or video digital data is permitted only when DGCCI thereof is in a state of copy with restriction or copy prohibition, and is not permitted when in a state of copy free. Therefore, in the case where the digital CCI data is in a state of copy free (YES in step S3), it is determined as an unauthorized copy disc. As a result of this, a digital output circuit is controlled to mute only digital signal output, or both the digital output circuit and the analogue output circuit are controlled to mute both the digital signal output and analogue signal output together (step S4).

On the other hand, in the case where it is determined that the DGCCI data is not in a state of copy free in step S3, normal reproduction is conducted in step S8. Furthermore, in the case where encryption is not detected in step S1 and in the case where DGCCI data is not detected in step S2 even though encryption is detected in step S1, a WM decoder (169) decodes to detect WMCCI data (step S9). In the case where there is detected WMCCI data, it is determined in step S10 whether the WMCCI data is in a state of copy free or not. As shown in FIG. 13, in the present invention, normal reproduction is permitted only in the case where the WMCCI data is in a state of copy free (step S12), and in the cases of copy with restriction or copy prohibition state, it is determined as an unauthorized copy disc. As a result of this, a digital output circuit is controlled to mute only digital signal output, or the digital output circuit and analogue output circuit are both controlled to mute both digital signal output and analogue signal output together (step S11).

Then, a terminal end of reproduction units is judged (step S5) and when judged NO in step S5, the process returns to step S1, and when judged YES in step S5, the process advances to step S6 to judge whether the terminal end is a terminal end of the entire reproduction. In the case of NO in step S6, the digital output circuit and the analogue output circuit are reset to the normal output states, then returning to step S1. On the other hand, in the case of the terminal end of entire reproduction, the reproduction is ended.

As to the WMCCI as describe above, detail explanation will be made with reference to FIGS. 11A and 11B. WM signal is generally produced by a technique in which after encoding certain necessary information into an audio or video signal to thereby make a bit stream, certain necessary information data is encoded into an audio or video signal to be embedded into the bit stream in such a manner that when a user reproduces the bit stream, the WM signal is imperceptible or inaudible such that the user cannot recognize the change in the audio or video signal compared to the original signal.

Figure 11A:
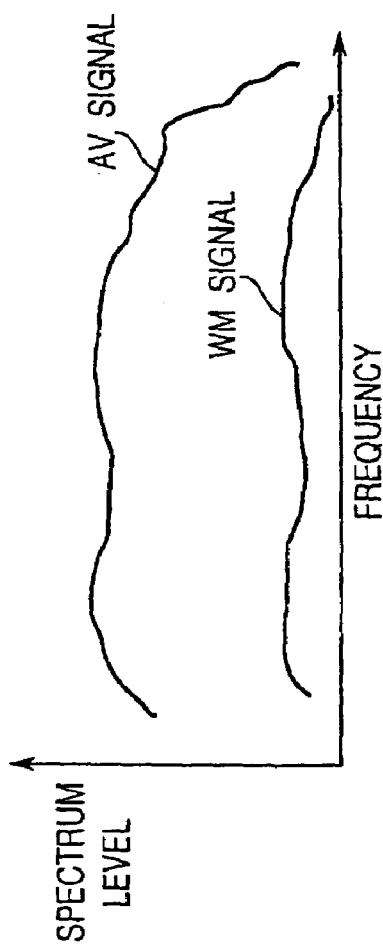
FIG. 11A and FIG. 11B are views for explaining concept of digital copy control management information.
Figure 11B:
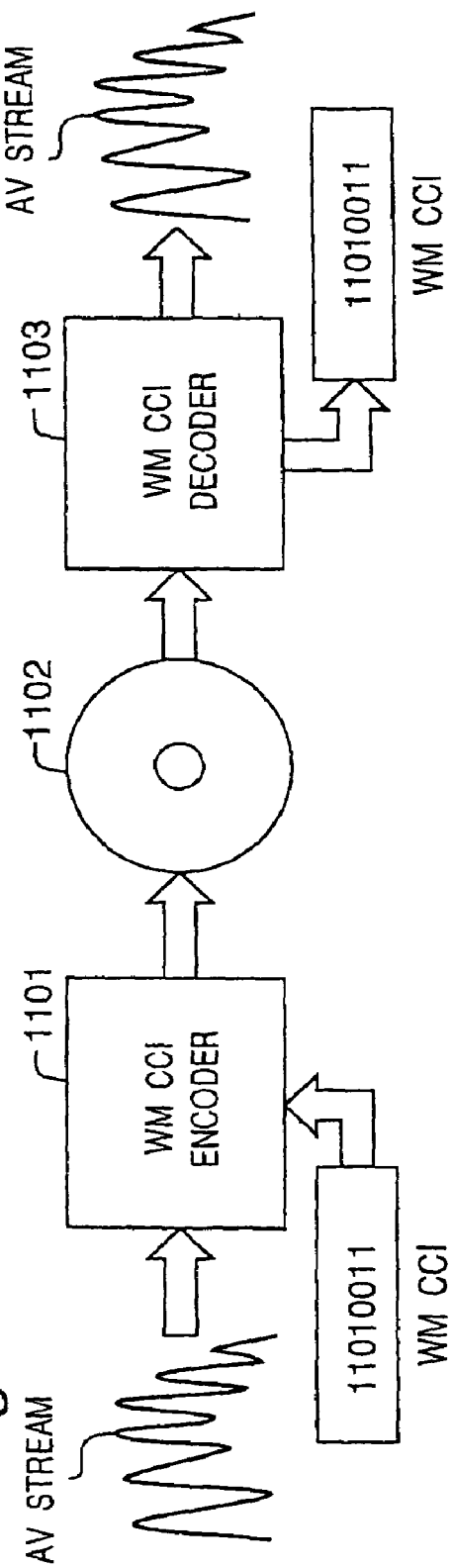

In the present invention, as shown in FIG. 11A, using a spread spectrum technique, WMCCI of a sufficiently low spectrum level in a user's unrecognizable degree is added to audio and/or video signal and embedded therein within a certain frequency band. As shown in FIG. 11B, in the present embodiment, after encoding WMCCI data into an audio or video signal by means of a WM encoder 1101 to thereby make it into a bit stream, the bit stream is recorded to a recording disc 1102. Then, at the time of reproducing the recorded data from the disc, the WMCCI data is decoded by means of the WMCCI decoder 1103 while the audio or video signal is reproduced from the bit stream. At this reproduction time, even if WMCCI data is recorded and embedded in the AV data, the user can not recognize the change in the AV signal in comparison with the original signal because of the low spectrum level. According to the above configuration, since WMCCI data is recorded in a state embedded in the audio or video signal, WMCCI data can exist also in the audio or video signal of an analogue reproduction signal as well as in a digital reproduction signal.

Figure 20:
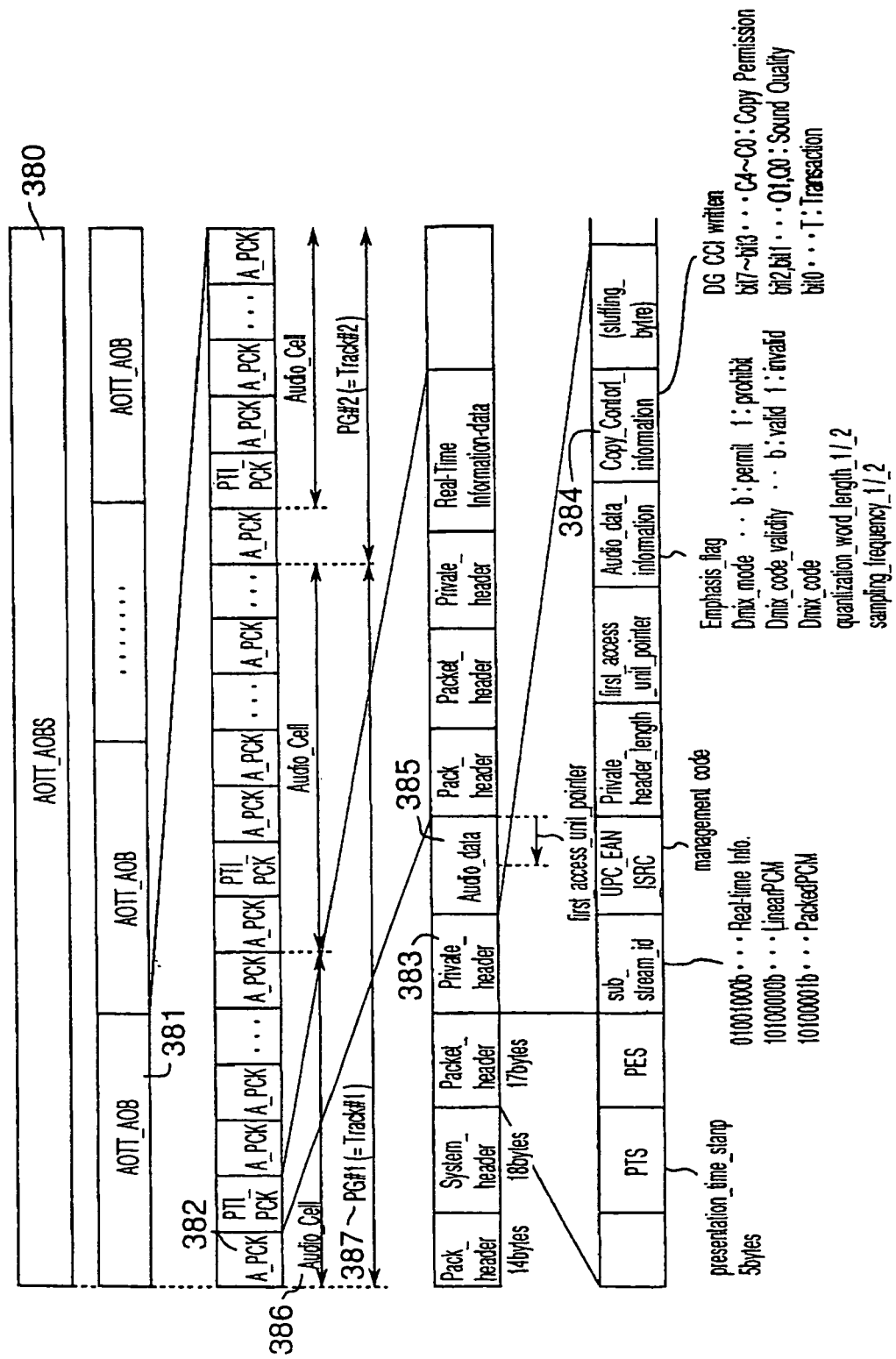
FIG. 20 is a view showing relationship between object reproduction unit and CCI data in the conventional art.

Whereas, in the conventional technique, since the conventional digital CCI data is included in PrivateHeader of the data as shown by areas 383 and 384 in FIG. 20, CCI data can exist only in an audio or video signal of a digital reproduction signal and does not exist in an analogue reproduction signal.

Figure 9:
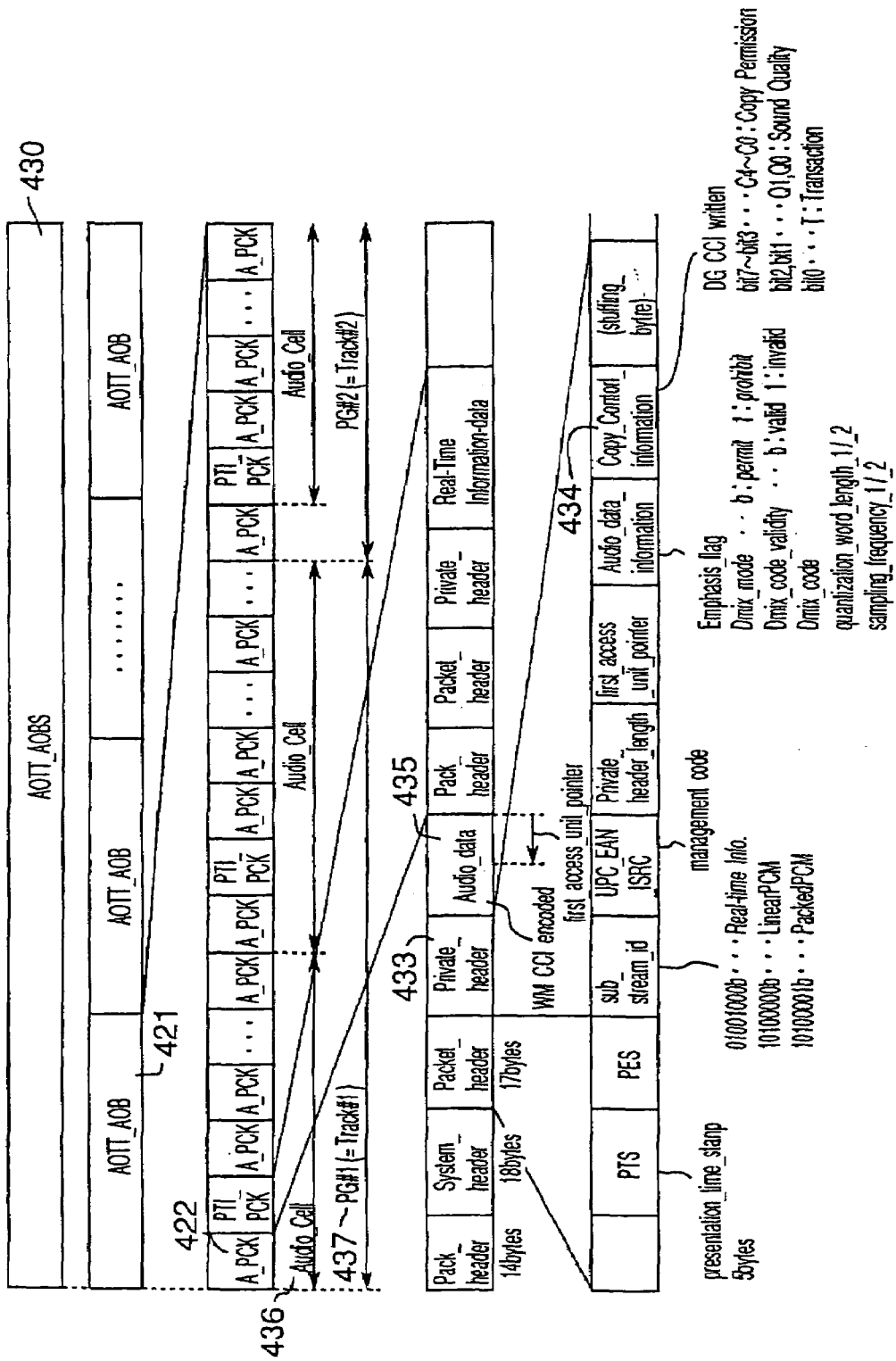
FIG. 9 is a view showing CCI data on an object data structure in the same embodiment.

In the present embodiment, as shown by a region 435 in FIG. 9, since the WMCCI is included in the audio (or video) data region, the WMCCI can exist also in the audio/video signal of an analogue reproduction signal as well as in a digital reproduction signal.

Second Embodiment

In the first embodiment, while the above description has been made for the case of using an optical disc as a recording medium which stores digital audio or digital video data including copy controlling management information (CCI) in the forms of watermark (WM) data and digital (DG) data, the present invention is not limited to this and applicable to various comparable media for recording and reproducing digital data, for example, tape and semiconductor memory.

The essential feature of the present invention is a multimedia copy control system for controlling a copy of a digital data recording medium in which digital contents data is stored and from which the digital contents data is reproduced and recorded to another recording medium for copying, wherein the digital contents data stored in the digital data recording medium includes a first copy control information (DGCCI) of a digital format and a second copy control information (WMCCI) of an analog embedded format. The system comprises: encryption judging means decrypting reproduction output data from the digital data recording medium and judging whether the reproduction output data is encrypted data; first copy control detection means detecting the first copy control information (DGCCI) from the decrypted reproduction data; extraction means extracting the digital contents data from the decrypted reproduction data; and second copy control detection means detecting the second copy control information (WMCCI) from the extracted digital contents data, wherein encryption of the reproduction output data from the recording medium is decrypted and judged for each digital contents unit under reproduction, and in the case where said first copy control detection means detects the first copy control information (DGCCI), the reproduction of the digital contents data is controlled based on the first copy control information (DGCCI), and in the case where said first copy control detection means detects no first copy control information (DGCCI), the reproduction of the digital contents data is controlled based on the second copy control information (WMCCI).

According to the second embodiment, by applying not only to the optical disc but also various kinds of digital data recording media, an unauthorized copy of recording medium and the like is discriminated and reproduction limitation is added to the medium at the time of reproducing the recording medium, whereby it is possible to prevent unauthorized copies from being copied freely.

As describe above, according to the present invention, in addition to digital copy controlling management information data, watermark copy controlling management information data is recorded on a recording medium, and when in reproducing the recording medium, the digital copy controlling management information is read out by decrypting an encryption from the reproduction output data; and the watermark copy controlling management information is read out from a digital audio or video signal from the output data to detect the encryption in a reproduction unit of the digital audio or video contents under reproduction; and in the case where encryption has been made, reproduction control is performed in accordance with the digital copy controlling management information, while on the other hand in the case where encryption has not been made, reproduction control is performed in accordance with said watermark copy controlling management information. Accordingly, advantageous effect is obtained such that even if digital copy controlling management information data is tampered using an unauthorized recorder and an authorized digital copy is made, or an unauthorized analogue copy is made by using an unauthorized recorder, it is possible to prevent unlimited unauthorized copies from being created by adding reproduction limitation by judging as an illegal recording medium at the time of reproduction.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

The present disclosure relates to subject matter contained in priority Japanese Patent Application No. HEI 2000-32911, filed on Feb. 10, 2000, the contents of which is herein expressly incorporated by reference in its entirety.

What is claimed is:

1. A multimedia copy control system for controlling a copy of a digital data recording medium in which digital audio data is stored and from which the digital audio-data is reproduced and recorded to another recording medium for copying, wherein the digital audio data stored in the digital data recording medium includes a first copy control information of a digital format and a second copy control information of an analog embedded format, said system comprising:

an encryption decoder configured to decrypt reproduction output data from the digital data recording medium to judge whether the reproduction output data is encrypted data;

a first copy control detector configured to detect the first copy control information from the decrypted reproduction data;

a contents data decoder configured to extract the digital audio data from the decrypted reproduction data; and a second copy control detector configured to detect the second copy control information from the extracted digital audio data, wherein encryption of the reproduction output data from the recording medium is decrypted and judged for each digital contents unit under reproduction, and when said first copy control detector detects the first copy control information, the reproduction of the digital audio data is controlled based on the first copy control information, and when said first copy control detector detects no first copy control information, the reproduction of the digital audio data is controlled based on the second copy control information.

2. The multimedia copy control system as claimed in claim 1, wherein each of the first and second copy control information includes three copy control states of copy free, copy permission with restriction and copy inhibition, and in the case where the copy control state of the first copy control information is the copy free state, the reproduction is controlled to be inhibited, and in the case of the copy permission with restriction and copy inhibition states, the reproduction is controlled to be permissive, and in the case where the copy control state of the second copy control information is the copy free state, the reproduction is controlled to be permissive, and in the case of the copy permission with restriction and copy inhibition states, the reproduction is controlled to be inhibited.

3. The multimedia copy control system as claimed in claim 1, wherein said recording medium stores the first and second copy control information being allocated in pair for each digital contents unit.

4. The multimedia copy control system as claimed in claim 1 further comprising:

an analog output controller configured to generate analog data from the extracted digital audio data;

a digital output controller configured to convert the extracted digital audio data to a specified output format data to be generated therefrom;

wherein the digital audio data outputted via said digital output controller includes both the first and second copy information, and the analog contents data outputted via said analog output controller includes only the second copy control information.

5. A multimedia copy control method for controlling a copy of a digital data recording medium in which digital audio data is stored and from which the digital audio data is reproduced and recorded to another recording medium for copying, wherein the digital audio data stored in the digital data recording medium includes a first copy control information of a digital format and a second copy control information of an analog embedded format, said method comprising:

decrypting reproduction output data from the digital data recording medium to judge whether the reproduction output data is encrypted data;

detecting the first copy control information from the decrypted reproduction data;

extracting the digital audio data from the decrypted reproduction data; and detecting the second copy control information from the extracted digital audio data, wherein encryption of the reproduction output data from the recording medium is decrypted and judged for each digital contents unit under reproduction, and when the first copy control information is detected, the reproduction of the digital audio data is controlled based on the first copy control information, and when the first copy control information is not detected, the reproduction of the digital audio data is controlled based on the second copy control information.

6. The multimedia copy control method as claimed in claim 5, wherein each of the first and second copy control information includes three copy control states of copy free, copy permission with restriction and copy inhibition, and in the case where the copy control state of the first copy control information is the copy free state, the reproduction is controlled to be inhibited, and in the case of the copy permission with restriction and copy inhibition states, the reproduction is controlled to be permissive, and in the case where the copy control state of the second copy control information is the copy free state, the reproduction is controlled to be permissive, and in the case of the copy permission with restriction and copy inhibition states, the reproduction is controlled to be inhibited.

7. An optical disk reproduction device for reproducing an optical disk in which digital audio data is stored and from which the digital audio data is reproduced for copying, wherein the digital audio data stored in the optical disk includes a first copy control information of a digital format and a second copy control information of an analog embedded format, said reproduction device comprising:

a stream data extractor configured to extract stream data from the reproduction output data of the optical disk;

an encryption decoder configured to decrypt the extracted reproduction stream data to judge whether the reproduction stream data is encrypted data;

a first copy control detector configured to detect the first copy control information from the decrypted reproduction stream data;

a contents decoder configured to extract and decode the digital audio data from the decrypted reproduction stream data;

a second copy control detector configured to detect the second copy control information from the extracted digital audio data;

an analog output controller configured to output analog contents data from the extracted digital audio data;

a digital output controller configured to convert the extracted digital audio data to a specified output format data to be generated therefrom; and a system controller configured to receive the first and second copy control information and controls said analog output controller and said digital output controller, wherein encryption of the reproduction output data from the optical disk is decrypted and judged for each digital contents unit under reproduction, and when said first copy control detector detects the first copy control information, the reproduction of the digital audio data is controlled based on the first copy control information, and when said first copy control detector detects no first copy control information, the reproduction of the digital audio data is controlled based on the second copy control information.

8. The optical disk reproduction device as claimed in claim 7, wherein when a reproduction permission condition is not met, said system controller controls said analog output controller and said digital output controller to restrict the reproduction based on at least one of the first and second copy control information.

9. The optical disk reproduction device as claimed in claim 7, wherein each of the first and second copy control information includes three copy control states of copy free, copy permission with restriction and copy inhibition, and in the case where the copy control state of the first copy control information is the copy free state, the reproduction is controlled to be inhibited, and in the case of the copy permission with restriction and copy inhibition states, the reproduction is controlled to be permissive, and in the case where the copy control state of the second copy control information is the copy free state, the reproduction is controlled to be permissive, and in the case of the copy permission with restriction and copy inhibition states, the reproduction is controlled to be inhibited.

10. The optical disk reproduction device as claimed in claim 7, wherein the digital audio data outputted via said digital output controller includes both the first and second copy control information, and the analog contents data outputted via said analog output controller includes only the second copy control information.

11. A digital data reproducing and recording system comprising a connected combination of a recording medium reproduction device for reproducing digital data of a recording medium and a recording medium recording device for recording the reproduced digital data to another recording medium, adapted to control a multimedia copy of the recording medium, wherein the digital audio data stored in the recording medium includes a first copy control information of a digital format and a second copy control information of an analog embedded format, said reproduction device comprising:

an encryption decoder configured to decrypt reproduction stream data output from the recording medium to judge whether the reproduction stream data is encrypted data;

a first copy control detector configured to detect the first copy control information from the decrypted reproduction stream data;

a contents decoder configured to extract the digital audio data from the decrypted reproduction stream data;

a second copy control detector configured to detect the second copy control information from the extracted digital audio data;

an analog output controller configured to generate analog contents data from the extracted digital audio data; and a digital output controller configured to convert the extracted digital audio data to a specified output format data to be generated therefrom, wherein, when said reproduction device and said recording device are digital-connected via said digital output controller, the digital audio data reproduced from said reproduction device includes both the first and second copy control information, and when said reproduction device and said recording device are analog-c connected via said analog output controller, the analog contents data reproduced from said reproduction device includes only the second copy control information.

12. The digital data reproducing and recording system as claimed in claim 11, wherein each of the first and second copy control information includes three copy control states of copy free, copy permission with restriction and copy inhibition, and in the case where the copy control state of the first copy control information is the copy free state, the reproduction is controlled to be inhibited, and in the case of the copy permission with restriction and copy inhibition states, the reproduction is controlled to be permissive, and in the case where the copy control state of the second copy control information is the copy free state, the reproduction is controlled to be permissive, and in the case of the copy permission with restriction and copy inhibition states, the reproduction is controlled to be inhibited.

13. A digital data recording medium adapted for multimedia copy control, said recording medium comprising:

at least one data storage region storing digital audio data which includes first copy control information of a digital format and second copy control information of an analog embedded format, said at least one data storage region storing said first and second copy control information allocated in pairs for each digital contents unit, wherein the digital audio data stored in the recording medium is adapted to be reproduced from the digital data recording medium so that the reproduced data is decrypted for use in judging whether the reproduction output data is encrypted data, the decrypted reproduction data being adapted for use in detecting the first copy control information and extracting the digital audio data therefrom, and the extracted digital audio data being adapted for use in detecting the second copy control information.

14. The digital data recording medium as claimed in claim 13, wherein each of the first and second copy control information includes three copy control states of copy free, copy permission with restriction and copy inhibition, and in the case where the copy control state of the first copy control information is the copy free state, the reproduction is controlled to be inhibited, and in the case of the copy permission with restriction and copy inhibition states, the reproduction is controlled to be permissive, and in the case where the copy control state of the second copy control information is the copy free state, the reproduction is controlled to be permissive, and in the case of the copy permission with restriction and copy inhibition states, the reproduction is controlled to be inhibited.

* * * * *